US012676854B2

(12) United States Patent
Graham et al.

(10) Patent No.: US 12,676,854 B2
(45) Date of Patent: *Jul. 7, 2026

(54) FILTERING, ANONYMIZING, AND STORING ANONYMIZED DATA AS PART OF AN AGE VERIFICATION PROCESS

(71) Applicant: Age Checked Limited, London (GB)

(72) Inventors: Alastair Graham, London (GB);
Charles Grech, Birkirkara (MT);
Conrad Micallef, Triq il-Hagar (MT)

(73) Assignee: Age Checked Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,555

(22) Filed: Aug. 22, 2022

(65) Prior Publication Data

US 2023/0120192 A1 Apr. 20, 2023

Related U.S. Application Data

(63) Continuation of application No. 16/494,469, filed as application No. PCT/IB2018/000363 on Mar. 16, 2018, now Pat. No. 11,425,119.

(Continued)

(51) Int. Cl.
*G06F 21/62* (2013.01)
*G06F 21/40* (2013.01)
(Continued)

(52) U.S. Cl.
CPC .......... *H04L 63/0861* (2013.01); *G06F 21/40* (2013.01); *G06F 21/6254* (2013.01);
(Continued)

(58) Field of Classification Search
CPC .... G06F 21/6254; G06Q 20/02; G06Q 20/40; H04L 63/0807
See application file for complete search history.

(56) References Cited

U.S. PATENT DOCUMENTS 10,984,458 B1 * 4/2021 Gutierrez ............. G06V 40/168
11,763,303 B1 * 9/2023 Kurani ............... G06Q 20/3821
705/39

(Continued)

FOREIGN PATENT DOCUMENTS

EP 2453400 A1 5/2012
EP 2879069 A2 6/2015
(Continued)

OTHER PUBLICATIONS

Anonymous, "Security Assertion Markup Language (SAML) V2.0 Technical Overview", Retrieved from the Internet URL: chrome extension://efaidnbmnnnibpcajpcglclefindmkaj/https://www.oasis-open.org/committees/download.php/27819/sstc-saml-tech-overview-2.0-cd-02.pdf), 51 pages, (Mar. 25, 2008).

*Primary Examiner* — David J Pearson
(74) *Attorney, Agent, or Firm* — Howard IP Law Group PC

(57) ABSTRACT

A computerized method for securely verifying age of users of remote devices interacting with provider resources includes receiving a request for age verification of the user; providing directly to the user device an interface for input of identifying data; receiving, from the user device, identifying data; providing, to a third party verification source, the identifying data; receiving, from the third party verification source, an indication of confirmation of the identifying data; determining, based on the received indication, whether a confidence level has been met; responsive to determining that a confidence level as been met, causing a token indicative of age verification to be generated; providing the token to the user device; providing a positive indication to the provider system, including identification of the token, and anonymizing user-identifiable data.

20 Claims, 16 Drawing Sheets

Related U.S. Application Data

(60) Provisional application No. 62/472,300, filed on Mar. 16, 2017.

(51) Int. Cl.

| | |
|---|---|
| *G06Q 20/02* | (2012.01) |
| *G06Q 20/38* | (2012.01) |
| *G06Q 20/40* | (2012.01) |
| *H04L 9/32* | (2006.01) |
| *H04L 9/40* | (2022.01) |
| *G06F 21/45* | (2013.01) |
| *G06Q 30/0601* | (2023.01) |

(52) U.S. Cl.

CPC ......... *G06Q 20/02* (2013.01); *G06Q 20/3821* (2013.01); *G06Q 20/385* (2013.01); *G06Q 20/40* (2013.01); *G06Q 20/4014* (2013.01); *H04L 9/3213* (2013.01); *H04L 63/0807* (2013.01); *H04L 63/0884* (2013.01); *H04L 63/18* (2013.01); *G06F 21/45* (2013.01); *G06Q 30/0607* (2013.01); *G06Q 2220/00* (2013.01)

(56) References Cited

U.S. PATENT DOCUMENTS

| | | | |
|---|---|---|---|
| 2001/0034718 A1* | 10/2001 | Shaked | .................. G06F 21/31 705/64 |
| 2002/0019828 A1 | 2/2002 | Mortl | |
| 2005/0137987 A1 | 6/2005 | May et al. | |
| 2006/0173792 A1 | 8/2006 | Glass | |
| 2006/0235796 A1 | 10/2006 | Johnson et al. | |
| 2007/0198435 A1 | 8/2007 | Siegal et al. | |
| 2007/0204168 A1 | 8/2007 | Cameron et al. | |
| 2007/0255810 A1 | 11/2007 | Shuster | |
| 2008/0033740 A1 | 2/2008 | Cahn et al. | |
| 2009/0164597 A1 | 6/2009 | Shuster | |
| 2011/0072039 A1 | 3/2011 | Tayloe | |
| 2012/0047560 A1 | 2/2012 | Underwood et al. | |
| 2013/0073974 A1 | 3/2013 | Bladel et al. | |
| 2013/0303275 A1 | 11/2013 | Mathews et al. | |
| 2014/0058945 A1 | 2/2014 | Stecher | |
| 2014/0059693 A1 | 2/2014 | Stecher | |
| 2015/0006201 A1 | 1/2015 | Pait et al. | |
| 2015/0149208 A1* | 5/2015 | Lynch | .................. G16H 10/60 705/3 |
| 2015/0180857 A1 | 6/2015 | Schulman et al. | |
| 2015/0379516 A1 | 12/2015 | Yingst et al. | |
| 2016/0117680 A1* | 4/2016 | Priel | ..................... G06Q 20/10 705/44 |
| 2016/0182231 A1 | 6/2016 | Fontecchio | |
| 2016/0358408 A1 | 12/2016 | Ovalle et al. | |
| 2017/0019400 A1 | 1/2017 | Drolshagen et al. | |
| 2017/0255940 A1* | 9/2017 | Kohli | ..................... G06Q 20/20 |

FOREIGN PATENT DOCUMENTS

| | | | | |
|---|---|---|---|---|
| WO | | 9107033 A1 | 5/1991 | |
| WO | WO-2008029141 A1 * | | 3/2008 | ......... G06Q 20/4014 |

* cited by examiner

550

| Merchant | Transaction Type | Jurisdiction | First Verification Type | Second Verification Type | Threshold Confidence Level |
|----------|------------------|--------------|-------------------------|--------------------------|----------------------------|
| ABC Co. | Knife Purchase | UK | Driver's License Number | Passport Number | 85% |
| DEF Co. | Knife Purchase | UK | Credit Card Number | Driver's License Number | 80% |
| DEF Co. | Ammunition Purchase | USA - NY | User Choice -Driver's License Scan   or Federal Employment ID Scan | N/A | 85% |
| GHI Co. | Age 13 Plus Content | USA - CA | Phone Number | School Identification Scan | 95% |

*Fig. 5*

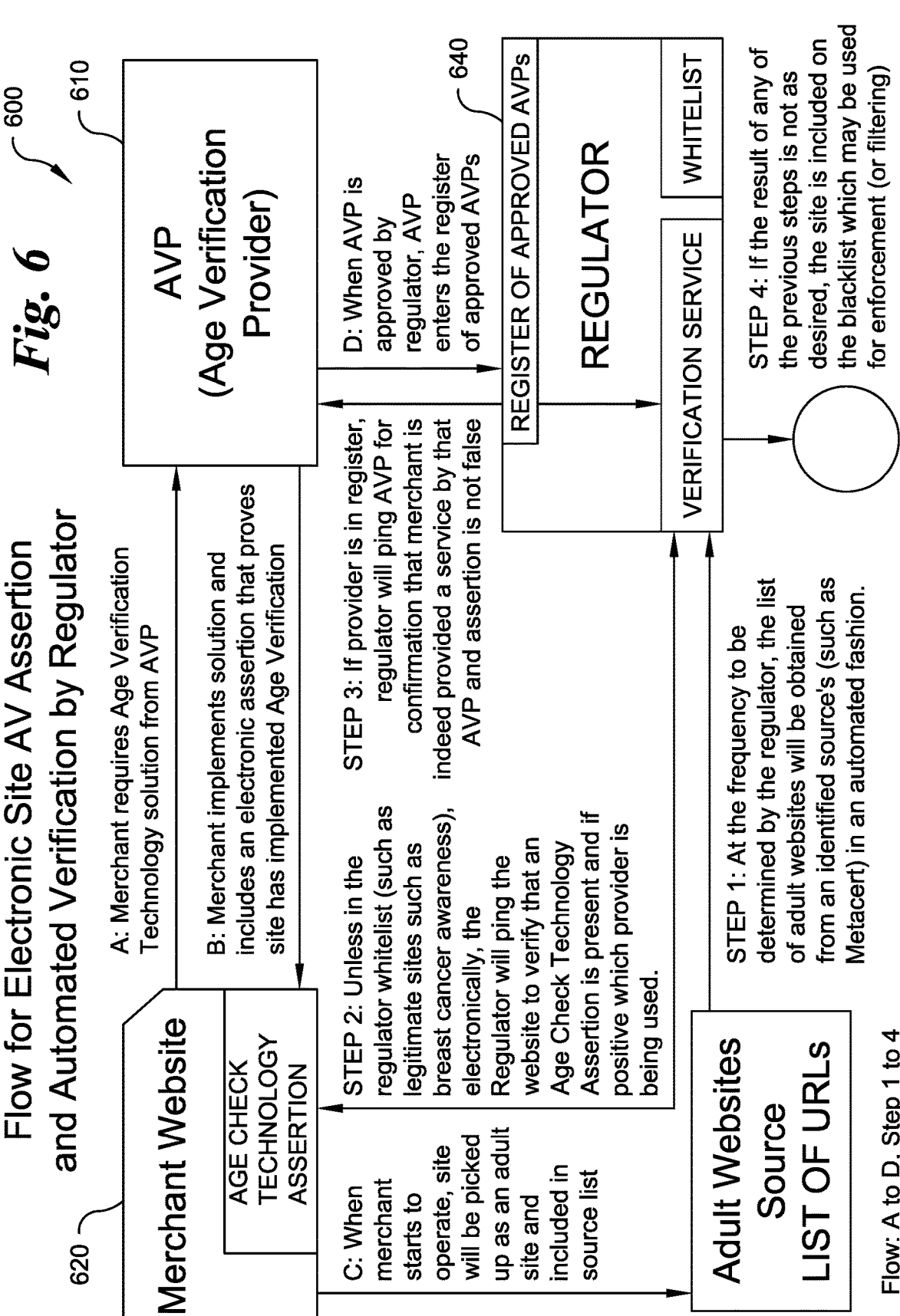

*Fig. 6*

Flow for Electronic Site AV Assertion and Automated Verification by Regulator

600

610 — AVP (Age Verification Provider)

620 — Merchant Website

AGE CHECK TECHNOLOGY ASSERTION

640 — REGISTER OF APPROVED AVPs

REGULATOR

VERIFICATION SERVICE

WHITELIST

Adult Websites Source LIST OF URLs

A: Merchant requires Age Verification Technology solution from AVP

B: Merchant implements solution and includes an electronic assertion that proves site has implemented Age Verification C: When merchant starts to operate, site will be picked up as an adult site and included in source list D: When AVP is approved by regulator, AVP enters the register of approved AVPs STEP 1: At the frequency to be determined by the regulator, the list of adult websites will be obtained from an identified source's (such as Metacert) in an automated fashion.

STEP 2: Unless in the regulator whitelist (such as legitimate sites such as breast cancer awareness), electronically, the Regulator will ping the website to verify that an Age Check Technology Assertion is present and if positive which provider is being used.

STEP 3: If provider is in register, regulator will ping AVP for confirmation that merchant is indeed provided a service by that AVP and assertion is not false STEP 4: If the result of any of the previous steps is not as desired, the site is included on the blacklist which may be used for enforcement (or filtering)

Flow: A to D, Step 1 to 4

Text

770
Loads allowed
AV methods

772
User selects
AV Method?

744
Does
user email-id
exist?          Y

N

746
Is user
access count multiple
of (say)10?          N

Y

Open Modal to
capture users
email-id

748

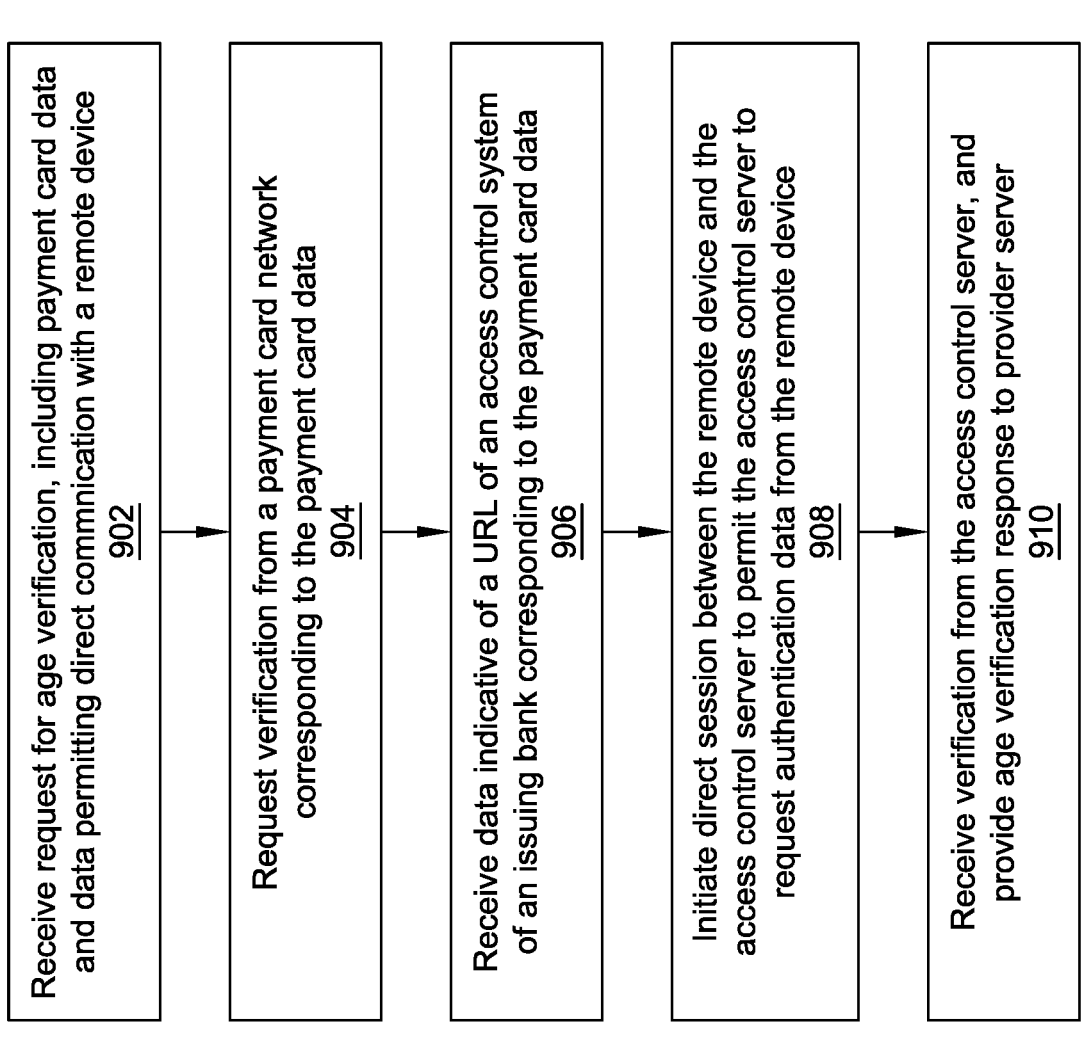

*Fig. 9*

Receive request for age verification, including payment card data and data permitting direct commmication with a remote device
902

Request verification from a payment card network corresponding to the payment card data
904

Receive data indicative of a URL of an access control system of an issuing bank corresponding to the payment card data
906

Initiate direct session between the remote device and the access control server to permit the access control server to request authentication data from the remote device
908

Receive verification from the access control server, and provide age verification response to provider server
910

FILTERING, ANONYMIZING, AND STORING ANONYMIZED DATA AS PART OF AN AGE VERIFICATION PROCESS

CROSS-REFERENCE TO RELATED APPLICATIONS

This application is a continuation of co-pending U.S. patent application Ser. No. 16/494,469 filed Sep. 16, 2019, which is the national stage application under 35 U.S.C. § 371 of International Application No. PCT/IB2018/000363 originally identified as PCT/US2018/022883 filed on 16 Mar. 2018, and claims the benefit of U.S. Provisional Patent Application No. 62/472,300, filed Mar. 16, 2017, the entire disclosures of which are incorporated herein by reference in their entireties.

FIELD

Embodiments relate to systems and methods relating to data security, and particularly data security in connection with verification of user characteristics, such as age, in a networked environment.

BACKGROUND

A wide variety of products, services, commercial spaces and the like are restricted to persons meeting one or more age requirements, such as a minimum age for many contexts, a maximum age, in contexts such as resources intended exclusively for children, or within an age band. The minimum age for many purchases and access to content is either 18 years or 21 years. Some online resources limit participation to children in certain age bands, such as no younger than 12 years and no older than 15 years. In non-technological encounters, such as an individual attempting to make an in-person purchase of a product, such as an alcoholic beverage or a weapon, subject to an age restriction, a sales clerk or the like may simply judge based on appearance that the purchaser's age is in excess of the required minimum age. This simple practice provides immediate age verification for many situations. Alternatively, the representative of the seller may request that the individual provide a document verifying the individual's age. Such a document may be requested if the purchaser's appearance does not immediately convey the individual's age, or if government regulation or seller policies require presentation of such a document. For example, the U.S. Food and Drug Administration requires that sellers of tobacco products check the photo identification of any prospective purchaser who appears to be 27 years old or younger. Such documents are typically issued by government agencies, and may include such documents as driver's licenses, passports, identity cards and the like. The individual presents the document to the representative, such as a clerk at a brick and mortar retail store, who inspects the document for authenticity and confirms that the photograph or other identifying information on the document corresponds to the individual. If the representative, based on the inspection and confirmation, determines that the individual meets applicable age requirements, then the transaction may proceed. In many instances, no record is made by the representative of the individual's identity. Thus, there is no record maintained by the seller that ties the individual to the seller, and the verification process is quick. New technological arrangements, such as e-commerce, or real-time verification systems at brick and mortar stores, present a new challenge. In these arrangements, in order to verify an age requirement, the individual provides identity data and details of a document to a seller, provider of content or the like. The seller or provider then transmits the data to one or more resources, such as a provider of driver's license verifications, to verify the accuracy of the document. This process results in retained data indicative of such data as names, e-mail addresses, Internet protocol addresses, and other data, of the user verifying age, with the e-commerce merchant system or brick and mortar store system.

A challenge that has arisen as a result of use of age verification techniques in the present ecommerce environment is the risk of misappropriation of such stored user information employed in age checking. Such misappropriation may lead to financial loss, such as through identity theft, and to embarrassment through publicizing of the use particular merchants and service providers. In widely-publicized incidents, hackers have obtained and published data, such as IP addresses and e-mail addresses, from which identities of users of particular merchants and service providers may be obtained.

Alternative systems and methods are desired to provide for both age verification and security of user information.

SUMMARY

In some embodiments, a computerized method is provided to perform age verification while addressing the technical problem of misappropriation of data with technical solutions. The technical solutions include performing age verification processes by a system independent of an e-commerce or other merchant server, with direct transfer of user identifiable data from the user device to the independent system, providing of tokens to indicate verification without providing user identifiable data to e-commerce systems, and anonymization of user-identifiable data for storage at the independent system. These technological implementations, at least in combination, provide for a technical solution to the technical challenge of preventing misappropriation of user data provided in connection with age verification.

In embodiments, a computerized method for verifying age of a user communicating from a remote device with a provider system may include receiving, by a central computer system, from the provider system, data including a request for verification of the user; determining, based on at least one of the data received from the provider system and data on the remote device, whether the user is age verified; responsive to determining that the user is age verified, providing an affirmative indication to the provider system; responsive to determining that the user is not age verified, providing directly to the user device an interface for input of identifying data; receiving, from the user device, identifying data; providing, to a third party verification source, the identifying data; receiving, from the third party verification source, responsive data indicative of matching between the identifying data and data of the third party verification source; determining, based on the responsive data, whether a threshold confidence level for age verification has been met; responsive to a positive determination of confidence level, causing a token indicative of age verification to be generated; providing the token to the user device; and providing a positive indication to the provider system, including identification of the token.

In embodiments, the method may further include filtering identifiable data relating to the user age verification from non-identifiable data relating to the user age verification;

3 storing the non-identifiable data in a database; anonymizing the filtered identifiable data; and storing the anonymized data in the database.

In embodiments, the method may further include generating a transaction identifier associated with the user age verification; providing the transaction identifier to the third party verification source; and storing the transaction identifier in association with stored data relating to the user age verification.

In embodiments, a method may include receiving a request for verification of a user associated with a user device; opening a browser window in a browser running on the user device; attempting to open a URL listed on a directory of restricted URL's; responsive to receipt of a message denying opening of the URL, returning an indication that the user is not verified; responsive to receipt of an indication that the URL opens, returning an indication that the user is verified.

In embodiments, computer system for verifying age of a user communicating from a remote device with a provider system includes a central system memory, storing processor-executable instructions; and one or more central system computer processors in communication with the central system memory, the processor-executable instructions causing the one or more central system computer processors to: receive from the provider system, data indicative of user identification, including at least a payment card number comprising a predetermined number of digits in sequence; access data indicative of ranges of values for selected sub-sequences of digits, each of the ranges of values indicative of a range of values corresponding to ranges designated for issue of payment cards; apply the payment card number data to the data indicative of ranges of values, to determine whether or not the payment card data corresponds to one of the designated ranges; and perform one of the following steps: responsive to determining that the payment card data does not correspond to any one of the designated ranges, return an indication that age is not verified; and responsive to determining that the payment card data corresponds to one of the designated ranges, return an indication that age is verified.

In embodiments, a method for age verification of remote users includes: comprising: receiving, by a central computer system, from a provider system, a request for verification of a user employing a remote device; receiving data indicative of a plurality of contacts of the user; determining, by the central computer system, for each of the contacts, whether the contact is a verified user in a database of verified users maintained by the central computer system; dispatching, by the central computer system, an electronic message to each of the contacts determined to be a verified user, requesting verification of age of the user; receiving, by the central computer system, from the contacts, responses to the electronic messages; based on at least the responses, determining, by the central computer system, whether the user is verified; and responding to the request with a message indicative of the determination of whether the user is verified.

In embodiments, a computerized method for age verification of users, includes: storing, by a central computer system, a plurality of data tables having entries indicative of values for data indicative of verification types and confidence levels, each entry associated with a merchant and a location; permitting, by the central computer system, remote access by a merchant representative to alter the stored values of the entries associated with the merchant; responsive to receipt by the central computer system of a request for age verification of a user, associated with a merchant and a location, accessing, by the central computer system, the corresponding data table entries to determine associated verification type and confidence level; and based on the accessed verification type and confidence level, determine an age verification response.

In embodiments, a computerized method for age verification of a user communicating from a remote device with a provider server includes: receiving, by a central server system, from the provider server, a request for age verification, the request including data indicative of a payment card, and data permitting direct communication with the remote device; responsive to receipt of the request, requesting, by the central server system, verification from a payment card network corresponding to the payment card data; receiving, by the central server system, from the payment card network data indicative of a URL of an access control system of an issuing bank corresponding to the payment card data; initiating, by the central server system, a direct session between the remote device and the access control server to permit the access control server to request authentication data from the remote device; receiving, by the central server system, a verification response from the access control server; and providing, by the central server system, data indicative of approval or denial of age verification to the provider system.

BRIEF DESCRIPTION OF THE DRAWINGS

FIG. 5 illustrates an exemplary table maintained by a central system in an implementation of the present disclosure.

FIG. 6 is a schematic block diagram of a method and system for providing verification of implementation of age verification provider services in an implementation of the present disclosure.

FIGS. 7A-1, 7A-2, 7B-1, 7B-2, 7C-1 and 7C-2 provide a flow diagram depicting an exemplary process flow of an embodiment leveraging filtering schemes employed by service providers to block websites from devices.

FIG. 9 is a flow diagram illustrating a process flow that may be implemented in the embodiment of FIG. 8.

DETAILED DESCRIPTION

Figure 1:
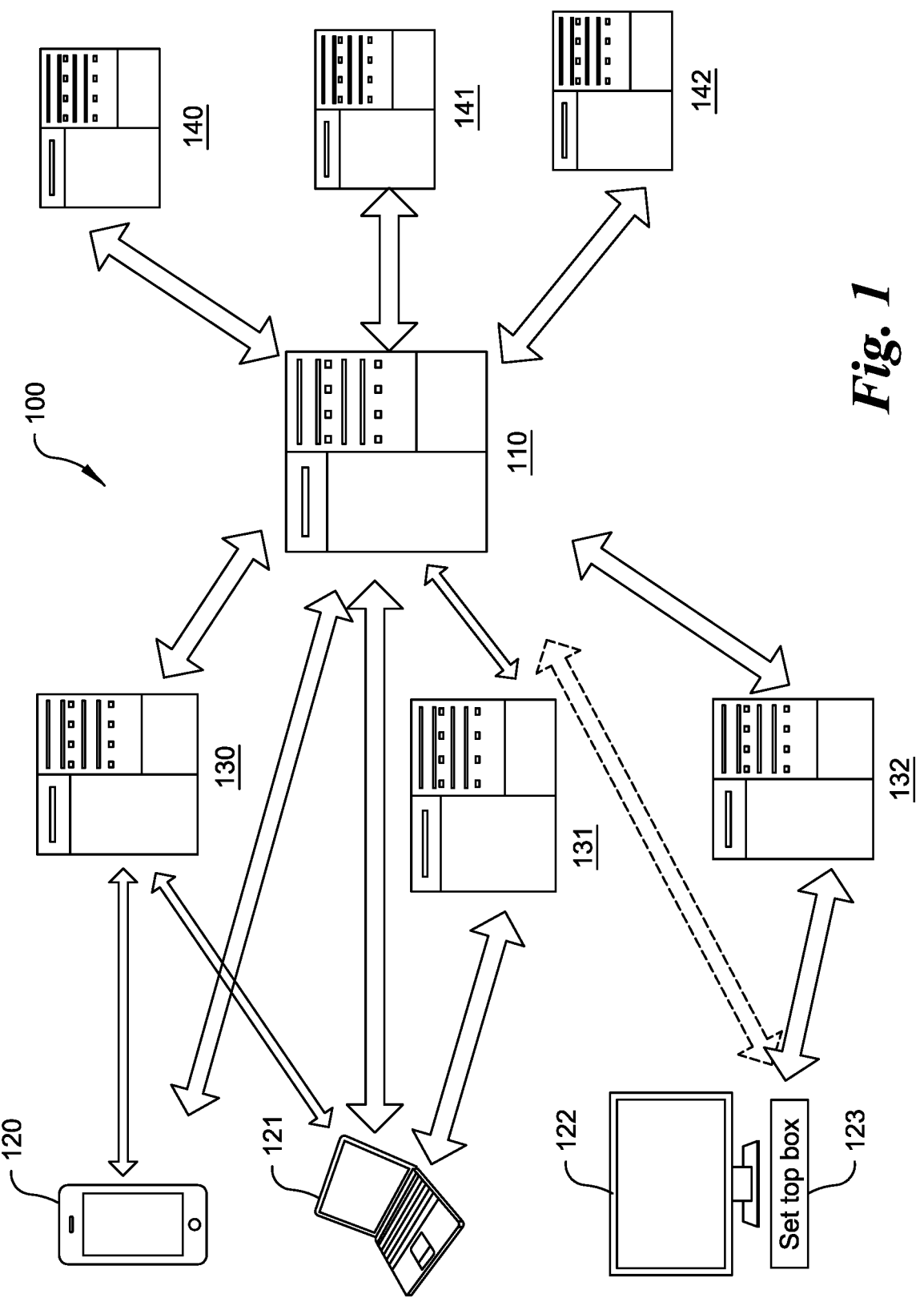
FIG. 1 is a schematic diagram of exemplary components in a network environment in which embodiments of the present disclosure may be implemented.

Disclosed herein are processor-executable methods, computing systems, and related processing relating to data security and verification of age of users in a networked environment. Conventional details of systems known to those of ordinary skill in the art are not shown. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Embodiments of the systems, methods and devices disclosed herein provide unconventional technological solutions to the technological challenges of achieving age verification with enhanced security. In embodiments, a central age verification server is in network communication with multiple age-verification data seeking servers. Such age-verification seeking servers may include merchant servers providing goods to customers, content providers providing content via open networks, such as the Internet; and content providers providing content via closed networks, such as cable and satellite server systems, by way of example. The central age verification server system is also in network communication with age verification resources. Age verification resources provide, in response to an inquiry, a response either confirming or denying age data submitted over the network. The central age verification server system is also in communication via the network with user devices.

The term "merchant" means any owner or operator of a website, system, or resource that seeks age verification services. The term "merchant" includes, by way of example, operators of sites providing content, social network services, operators of sites selling goods (including both stand alone online merchants and e-commerce operations of brick and mortar store operators) and others. The term "merchant server" includes a server (including multi-server systems) owned or operated by a merchant as defined above.

It will be understood that references to a "server," such as a central age verification server, include any number of servers operating to provide the recited services. A server may refer to a computer system, including computer processors, memory devices, busses, input/output devices, data storage devices and other hardware, programmed to operate as a server.

The central age verification server is configured to receive data indicative of a request from age verification data seeking servers. The data indicative of a request typically includes data indicative of an address of a user device and an indication of a selected age threshold and data confidence level. The data indicative of a request does not include such identifying data as name, e-mail or physical address, credit card number or the like. Thus, embodiments disclosed herein avoid the need to have the age verification data seeking server receive and transmit user data. In response to the receipt of the request, the central age verification server establishes a communication channel with the user device, employing the provided IP address data. The communication channel, which may be, for example, a browser-server arrangement, generating a pop up box on a user browser display, causes a display to be generated having fields for input of user data. The generation of the pop up box display may be performed in real time based on rules defined by the applicable merchant and a set of available rules and resources. The central age verification server then receives, via the communication channel, such as the browser-server channel, the identifying data. The identifying data is then provided to one of the age verification resources. A response is received by the central age verification server from the age verification resource.

Upon receipt of a response from the age verification resource, the central age verification server evaluates the response. The response may be evaluated to determine whether the results provide a level of confidence sufficient to meet the applicable merchant requirements. For example, the request may include multiple data fields, such as given name, surname, date of birth, number and street address, city, state, postal code, jurisdiction issuing identification document, and identification document (e.g., driver's license) number. The response may indicate a match for all fields, which the central age verification server then interprets as a positive response. Such a positive response is assigned a maximum level of confidence for the third party resource; different third party resources, and different verification methods, may have different maximum levels of confidence assigned. The level of confidence is compared with the required level of confidence. The response may indicate a match for some but not all fields. The response may provide a binary result for each field, or may provide additional details, such as the number of characters or digits not confirmed within a given field. The age verification server may apply an algorithm to determine a level of confidence, which may be normalized on a suitable scale. Each field may be given a same weighting, or various fields may be given different weightings. For example, a discrepancy in street address may be given a lower weight than a discrepancy in date of birth, as individuals change addresses periodically. Weightings may be system determined, may be selected by the merchant user, or may be given default values by the system that may be altered by the merchant user. The threshold values of confidence for various purposes, such as various jurisdictions and various requested permissions, may also be system determined, selected by the merchant user, or default values determined by the system that may be altered by the merchant user.

Responsive to a determination that the response from the age verification resource provides a required threshold level of confidence, the central age verification server creates a record including fields indicative of a transaction identity associated with an age verification source, a user identity, and the user verification data, such as data type, age verified, and confidence level. The user identity data is not stored; rather, sufficient data is maintained to permit verification, such as of e-mail addresses, and data records containing further detail are deleted. For example, the user identity data may be hashed and then saved in a database.

Responsive to determination by the central age verification server that, based on the response from the age verification resource, the age has been verified, the central age verification server further causes a token to be generated and provided to and stored on the user device. The generation of the token is independent of personally identifiable data, so that personally identifiable data cannot be extracted from the token. The token may be in the form of a browser cookie for example. Token data may be stored in the user database and associated with the user, so that a user may be immediately recognized.

In embodiments, representatives of merchant servers may be able to determine settings for age verification via interaction with user interfaces on the age verification server. A wide variety of settings may be determined, including minimum age levels for one or more types of content and products, minimum levels of confidence of age verification, minimum levels of confidence of absence of fraud, types of age verification, and other factors. Requirements may include a requirement for password log on, as opposed to relying on tokens stored on devices, maximum amounts of time accessing content prior to a need for reverification, varying levels of verification required at different times of day/days of week, reference to stored jurisdictional requirements, and other data. Verification may be provided by such measures as a mobile phone number, having a relatively low level of confidence, a credit card number, having a higher level of confidence, to forms of government-issued identification that can be checked against databases having relatively high levels of confidence. The interfaces permit the representative of the merchant to configure hundreds of thousands of different options for age verification.

In further embodiments, an application program stored on a memory in a user device may cause the user device to extract data relating to the device, as well as data stored by other applications on the device. The extracted data may include device data, such as MAC address, as well as data relating to use of other applications. One or more algorithms may be employed by the application program to determine such data as likely age and risk of fraud based on local applications. For mobile devices, the application may be configured to be executed in a mobile device operating system, such as one of the Android® operating systems, iOS®, or other. For laptop or desktop devices, the application may be configured to be executed on the Windows, Macintosh or other operating systems.

In embodiments, age verification may be performed by peer verification techniques. In peer verification techniques, the user may request that contacts, such as social media contacts, e-mail contacts and the like, who have been age verified, confirm the user's age to the central verification server. The central verification server may then determine that the user's age is verified based on, for example, a threshold number of verifying contacts. In another embodiment, the user may provide listings of contacts, such as e-mail contacts and social media contacts, to the central age verification server. The central age verification server may then determine whether one or more of the contacts are age-verified, based on stored and anonymized e-mail address data. The central age verification server may then dispatch requests for verification, such as by text message, e-mail, or other communication channels, to those contacts identified as age-verified. Responses will then be received, and based on a threshold number of positive responses, a lack of negative responses, or the like, the user may be deemed to be age verified.

In another embodiment, verification may be based on stored links between a token associated with a verified user and another type of technological identification. By way of example, stored biometric data may be associated with tokens in the central age verification server database. An example of an application that provides for access to devices using biometric data is the fingerprint identification provided by the Touch ID feature offered by Apple, of Cupertino, California Other biometric data, such as retinal scan data, may similarly be associated with one or more tokens. Similarly, other types of secure tokens may be associated with tokens.

A further technical challenge in connection with age verification is that, while possession of a valid payment card is an indicator that a user is at least a minimum age, the verification of validity of a payment card number may be difficult or may introduce delay into an age verification process. For example, an age verification central server may not be able to participate in a payment card interchange system. If an age verification central server does participate in a payment card interchange system, the response time for verification of validity of a payment card number may add delay to the age verification process.

An embodiment that leverages payment card data while overcoming the challenges of payment card interchange systems may employ an account range lookup method for verification. Account range lookup is a method of verifying age based on whether a submitted payment card number, such as a credit card, debit card, or stored value card number, is valid, without verification via a payment card interchange system. Applicable standards define uses and assignments of digits in payment card numbers. For example, the standard ISO/IEC 7812 may be used for identification of issuers. For example, the first digit is designated a Major Industry Identifier, and identifies categories of networks. For example, travel and entertainment category cards have a 3 as the first digit; certain banking cards, such as those in the VISA interchange network, have a 4 as the first digit, and others have a 5 as the first digit. The first six digits are the Issuer Identification Number or Bank Identification Number (BIN). These digits identify the issuer, whether the card is a credit, debit or prepaid card, and in some cases affinity programs. The final digit is a checksum. The digits between the BIN and the checksum are account numbers assigned by the issuer. Within the digits for issuer use, issuers typically assign account numbers in particular subranges. Other subranges are not employed. For example, certain subranges may be assigned to particular product types. For example, in a nine digit range available for the account number in a 16-digit card number, the issuer may use only the digit 0 in the first place of the range, and only the digits 0 to 5, or only certain digits, in other subranges. In embodiments, each of digits 0 to 5 in a second digit of the range may be assigned to particular products. Other ranges may be unassigned, and available upon introduction of a new product, for example. As additional cards are issued, more numbers in each of the subranges are issued.

The central age verification server obtains data indicative of assigned and unassigned subranges. The data may be obtained directly from financial institutions, from interchange networks, or indirectly from third parties. A user may be prompted to input a credit card number, as a sequence of digits, as possession of a credit card, as opposed to a debit card or stored payment card, is an indicator of age. The received number may be compared to stored numerical ranges to determine whether the number falls into a range in which a financial institution has issued payment cards. The stored valid ranges may be stored locally by the age verification server, or in one or more readily accessible memory locations. Responsive to determining that each digit in the received number is within a range corresponding to a valid BIN or IIN value, for certain places in the sequence, and by an issuing financial institution for other places in the sequence, the central age verification server may determine that the user is age-verified, or may use the positive determination as a positive factor in an age verification confidence algorithm. Responsive to determining that one or more digits is not consistent with a sequence of digits for a payment card issued by a financial institution, the central age verification server may determine that the user has not provided sufficient data for age verification. The central age verification server may employ the lack of verification as a negative factor in an age verification confidence algorithm, and/or may prompt the user for a different type of age verification data, by way of example. The use of such locally stored, or otherwise accessible, data indicative of valid and invalid payment card subranges, enables leveraging of payment card data while avoiding potential delays associated with payment card interchange networks.

In embodiments, the central age verification server may be configured to receive a request from a merchant system identifying a user as age-verified, and requesting issue of a token to the user. By way of example, the merchant system may be performing e-commerce transactions for a retail entity that has sufficient data regarding the age of certain customers, such as via recorded brick and mortar store transactions. The central age verification server may be configured to generate a record for a new registered user, similar to the process followed when a request is sent to a third party age verification resource; however, there is no code associating the record with a third party resource. By generating a token and providing it to the user device, the central age verification server permits the user to access age-limited at other sites, for example, as well as future transactions with the merchant system that provided the request.

In embodiments, the central age verification server may be configured to receive, from a merchant system, data regarding multiple customers or users, not synchronously with initiation of a transaction. For example, a batch of customer data may be received at the central age verification server from a merchant system. The central age verification server may then employ the data received from the merchant system to verify ages of customers and return age data to the merchant system. When the user next accesses the merchant site, the central age verification server receives data from the merchant system, identifies the corresponding user record, including a token, and provides the token to the user device. In this embodiment, the central age verification server does not generate pop up box or similar prompt for the user to input identification data.

In embodiments, a problem of an operator of a closed network, such as a cable or satellite television network, in which a request is received from a subscriber device, such as a set top box, for age-restricted content, is addressed. In this context, for example, one or more consumer devices attached to the set top box may be operated either by adults or children in a household. The request for access to the age-restricted content may require input of data related to age verification, such as a full or partial credit card number, full or partial Social Security or national identity number, full or partial driver's license number, or other age-verification related data, in accordance with the programming of the set top box. The operator may receive the input age verification related data, and provide the input age verification related data along with other customer data, such as subscriber address, to the central age verification server. The central age verification server may then perform age verification, including providing the input age verification data and other customer data to a resource, receiving returned data indicative of matches of fields in the provided data, processing the data to determine whether the received age verification data is consistent with the other subscriber data, and returning a result to the operator.

A technical challenge associated with age verification of users is that such a payment card or payment card data may be employed by someone other than the authorized user. In an embodiment, this challenge is addressed by leveraging enhanced security protocols, such as dual factor authentication.

Referring now to FIG. 1, exemplary components in a network environment in which embodiments of the present invention may be implemented will be described. Network environment 100 may include the Internet and other open networks, as well as cable and satellite systems and other closed networks. Central age verification server 110 is connected, via network communication channels, such as via the Internet, with age verification seeking servers 130, 131, 132, which may be referred to as merchant servers herein. Merchant servers 130, 131, 132 are connected via network communication channels to user devices 120, 121, 122, 123, which in this example include a smartphone 120, which may be networked via a cellular or Wi-Fi network to the Internet, a computer, such as the illustrated notebook computer 121, or devices connected via a closed network such as a cable or satellite network, such as illustrated television set 122 and set top box 123. From the user devices, the users connect to merchant servers 130, 131, and, in this example, cable or satellite head end 132. Responsive to a user request to perform an action requiring age verification, such as access age-restricted content, purchase an age-restricted product, or another action, the respective merchant server 130, 131, 132, directs a request for age verification to the central system 110. The central system 110 is configured to communicate directly with user devices 120, 121, such as via the Internet, or with television 122 and set top box 123 via the cable or satellite head end 132. The central system 110 generates a user interface on the device 120, 121, 123, such as via Java script, for selection of a verification method and to obtain verification information. The central system 110 may then query one or more third party data sources 140, 141, 142 for age verification data. Responsive to a positive response, the central system 110 causes a token to be generated, provided to the user device, and provided to the merchant server 130, 131, 132. The central system suitably anonymizes user data, so that neither the merchant servers nor the central system retains user identifiable data.

Figure 2:
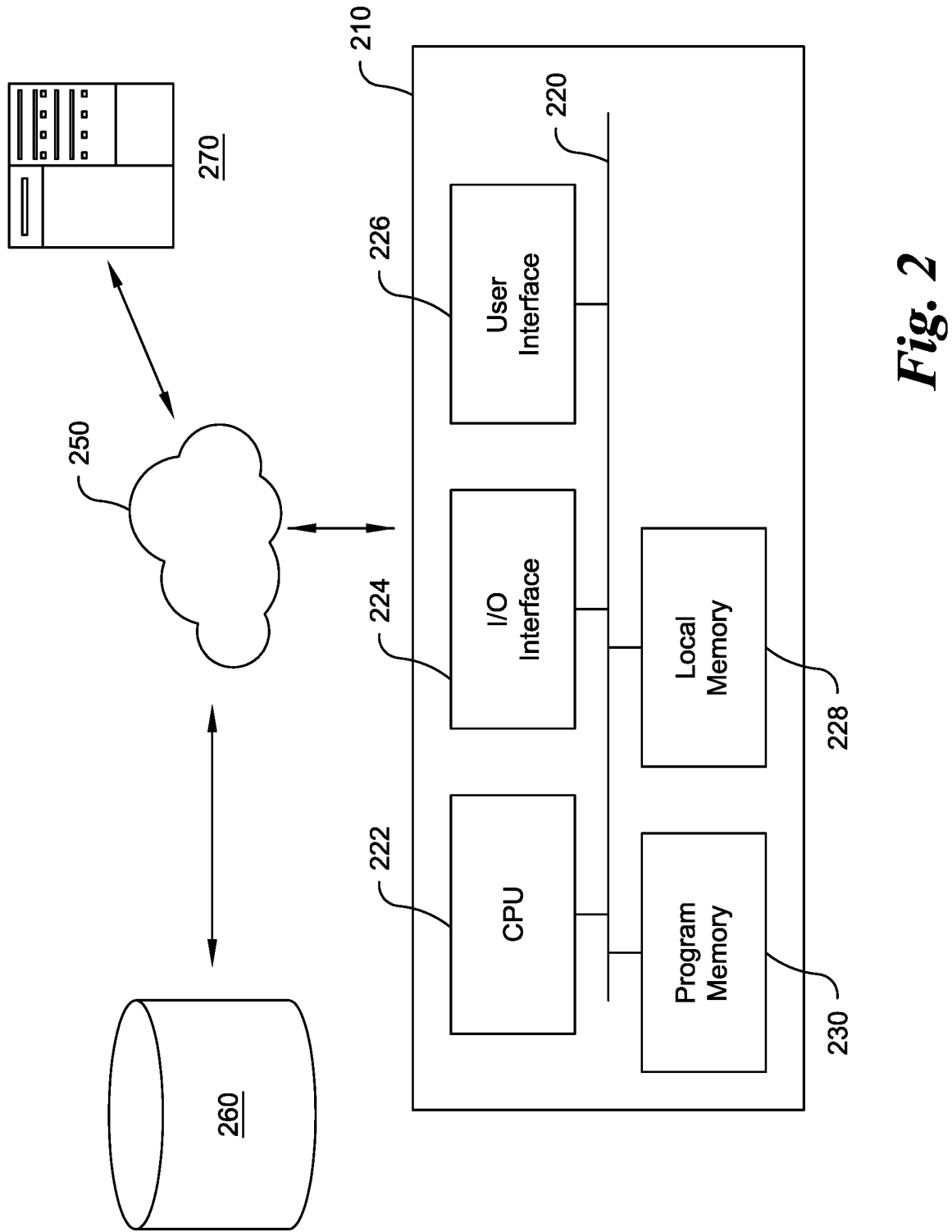
FIG. 2 is a schematic diagram of a server for implementing embodiments of the present disclosure.

Referring now to FIG. 2, there is shown an expanded block diagram of an architecture of an exemplary server of a system in accordance with some embodiments. Server 210 includes exemplary data bus 220 providing communication among system components. One or more computer processors, designated by central processing unit (CPU) 222, are in communication via data bus 220 with components including program memory 230, local memory 228, user interface 226, and input/output interface 224. Program memory 230 stores programs including an operating system (OS) which manages the computer hardware and provides common services for efficient execution of various logic circuitry including hardware, software and/or programs. Program memory 230 further stores application software, such as programs including computer-executable instructions which, when executed by one or more processors, cause the one or more processors to perform steps described in the present disclosure, including receiving and storing settings from merchant servers, steps of receiving and parsing requests via an API or otherwise, establishing communication with user devices, extracting token data from remote user devices, validating permissions based on extracted token data, generating interfaces on browsers on remote user devices, receiving user data, validating user data via third party resources, causing tokens to be generated and provided to user devices and confirmed to merchant servers, filtering and anonymizing data, and other functions. Program memory 230 further may include a device communication management program, which includes computer-executable instructions to manage communications, particularly communications with user devices, merchant servers, validation resources, and other computer systems. The processor 222 (or CPU) carries out the instructions of computer programs, which operates and/or controls at least a portion of the functionality of the server. Program instructions may be loaded into local memory 228 for efficient and high-speed execution by CPU 222. Programs may be arranged in one or more modules, and functionality of programs may be implemented in program code that may be arranged as one or more programs or modules, which need not be stored on a same memory device, or executed by a single CPU.

Server 210 further includes device input/output interface 224 configured to receive and output data from and/or to peripheral devices and networks operatively coupled to the system. Such networks may include exemplary local area network 250, which manages communications among devices within a system. Data storage devices, such as device 260 and associated management systems, such as hardware and software for database management systems, may be coupled to local area network 250. Local area network 250 may further be coupled, via one or more intermediary communication devices, such as firewall systems and other access management systems, (not shown), to external networks, which may be or include the Internet, as well as other wired and/or wireless networks, to remote devices and remote systems such as merchant server 270, and user devices. The I/O interface 224 may include an API configured to accept and parse requests from remote user devices and pass those requests to CPU 222 for processing using instructions of stored programs, as well as for user permissions and verification, by way of example. The I/O interface 224 may be configured to return data, such as positive age validation data, to external systems, such as merchant system 270, to cause the merchant systems to provide access to content, continue with a checkout procedure, or other steps, in embodiments.

The program memory 230 may include one or more of any form of data storage device including but not limited to electronic, magnetic, optical recording mechanisms, combinations thereof or any other form of memory device capable of storing data. The CPU 222 may be in the form of one or more computer processors, or may be in such forms as a distributed computing system, a centralized computing system, a network server with communication modules and other processors, or nearly any other automated information processing system capable of executing instructions stored in program memory.

Figure 3:
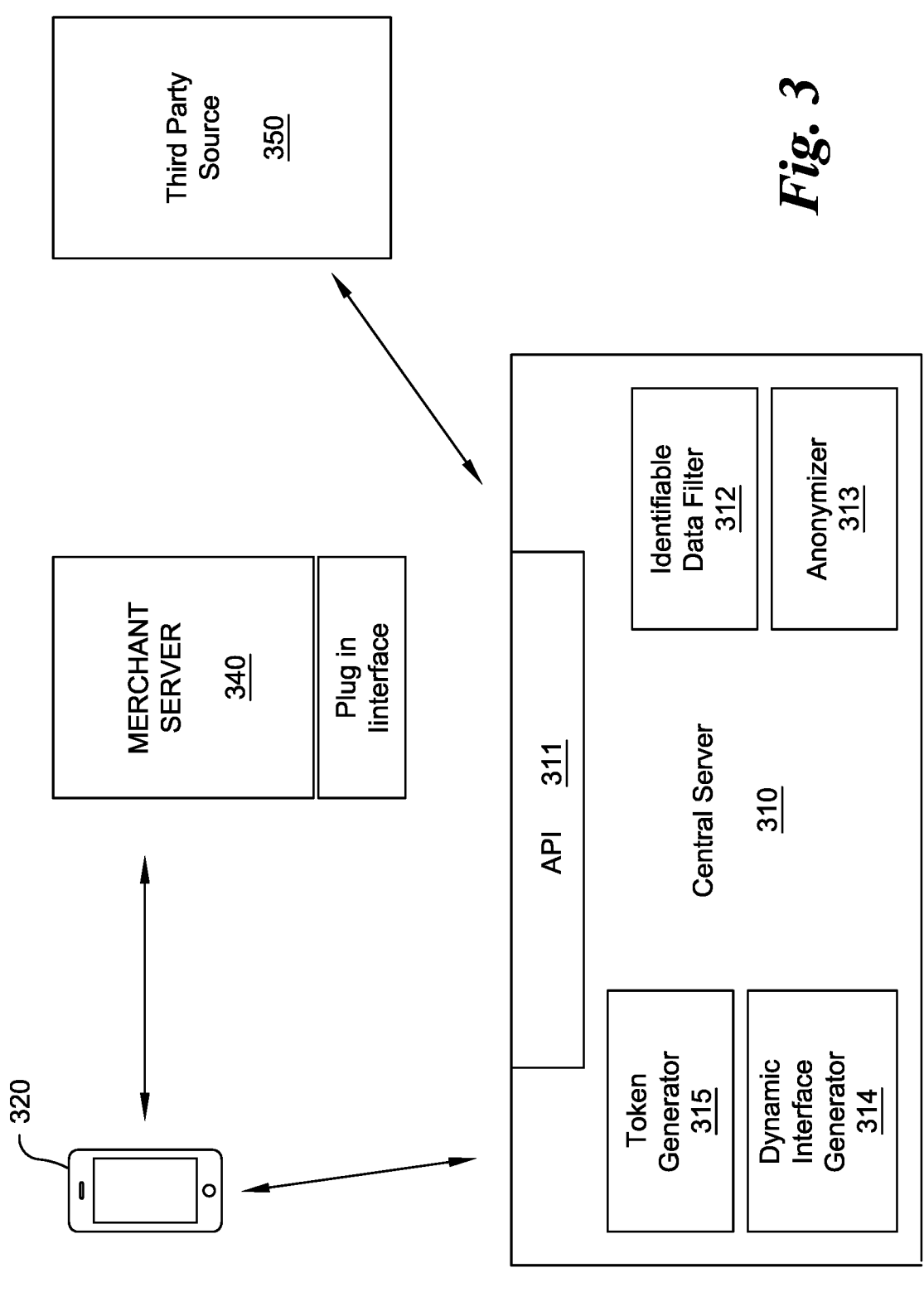
FIG. 3 is a schematic diagram showing components of a server in an environment in which embodiments of the present disclosure may be implemented.

Referring now to FIG. 3, there is shown a simplified schematic illustration of devices and systems employed in an exemplary implementation of the present disclosure. A central age verification computer system 310 is shown. An exemplary user device 320 is in communication with a merchant computer system 340. The merchant computer system is programmed to direct a request for age verification to the central age verification computer system, such as via API 311 responsive to a request for access to age-restricted content, or a request to purchase an age-restricted item, such as an alcoholic beverage or a weapon. In embodiments, a plug in operable on the merchant server system, which may be executing a commerce platform, such as one of the commerce platforms offered under the MAGENTO® brand, may be activated responsive to such a request. The plug-in may access the client device 320 to detect whether a token is present on the client device. Responsive to detecting a token, the plug in component may communicate with the age verification server 310 to authenticate the token. Responsive to authentication of the token, the merchant computer system will then proceed to deliver content, or proceed with an order check out or other process. The merchant server may also interact with the age verification server 310 to configure the age verification server for parameters such as user ages, types of identification or verification required, and other parameters.

The age verification server 310 performs numerous age verification functions. The age verification server 310 receives requests from merchant server system 340 for authentication of user tokens, generates dynamic interfaces for display on user devices via dynamic interface generator

314, generates tokens via token generator 315 to provides the tokens to user devices (such as in the form of browser cookies), generates and sends requests to third party systems 350 for verification, and receives verification data from third party systems 350. Age verification server 310 further, via identifiable data filter 312, separates user data that cannot be associated with a user and user data that can be associated with a user. User data that cannot be associated with a user is maintained in a database. User data that can be associated with a user, such as name, postal address, e-mail address, IP address, credit card number and the like is anonymized, via anonymizer 313, such as by one-way hashing, and stored in a database. The age verification server further is configured to store data indicative of requests to third party servers, such as an alphanumeric code identifying each request, and associating the request with a user account, to provide for an audit trail.

Figure 4A:
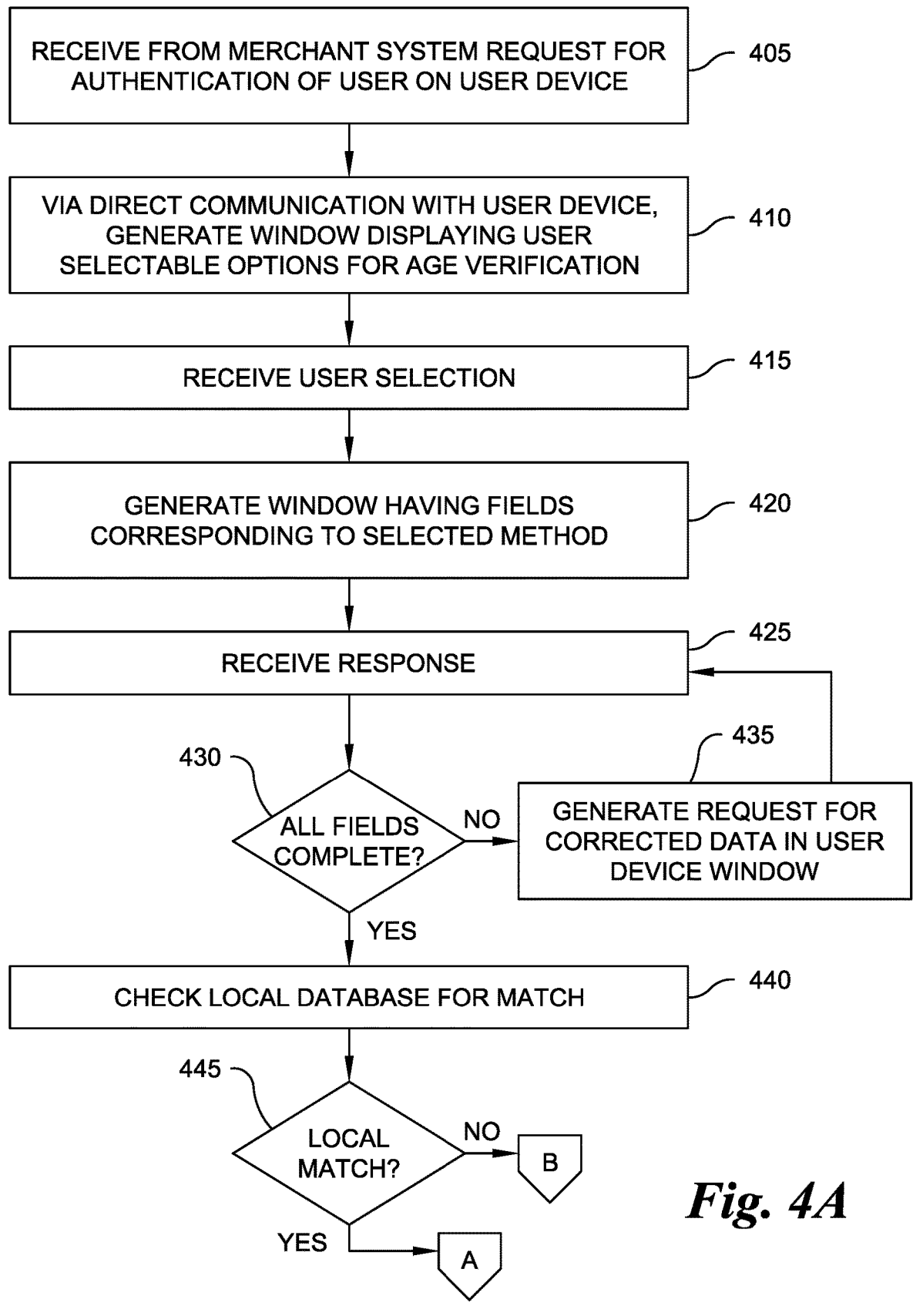
FIGS. 4A, 4B and 4C illustrate a process flow diagram of an exemplary process in connection with an implementation of the present disclosure.
Figure 4B:
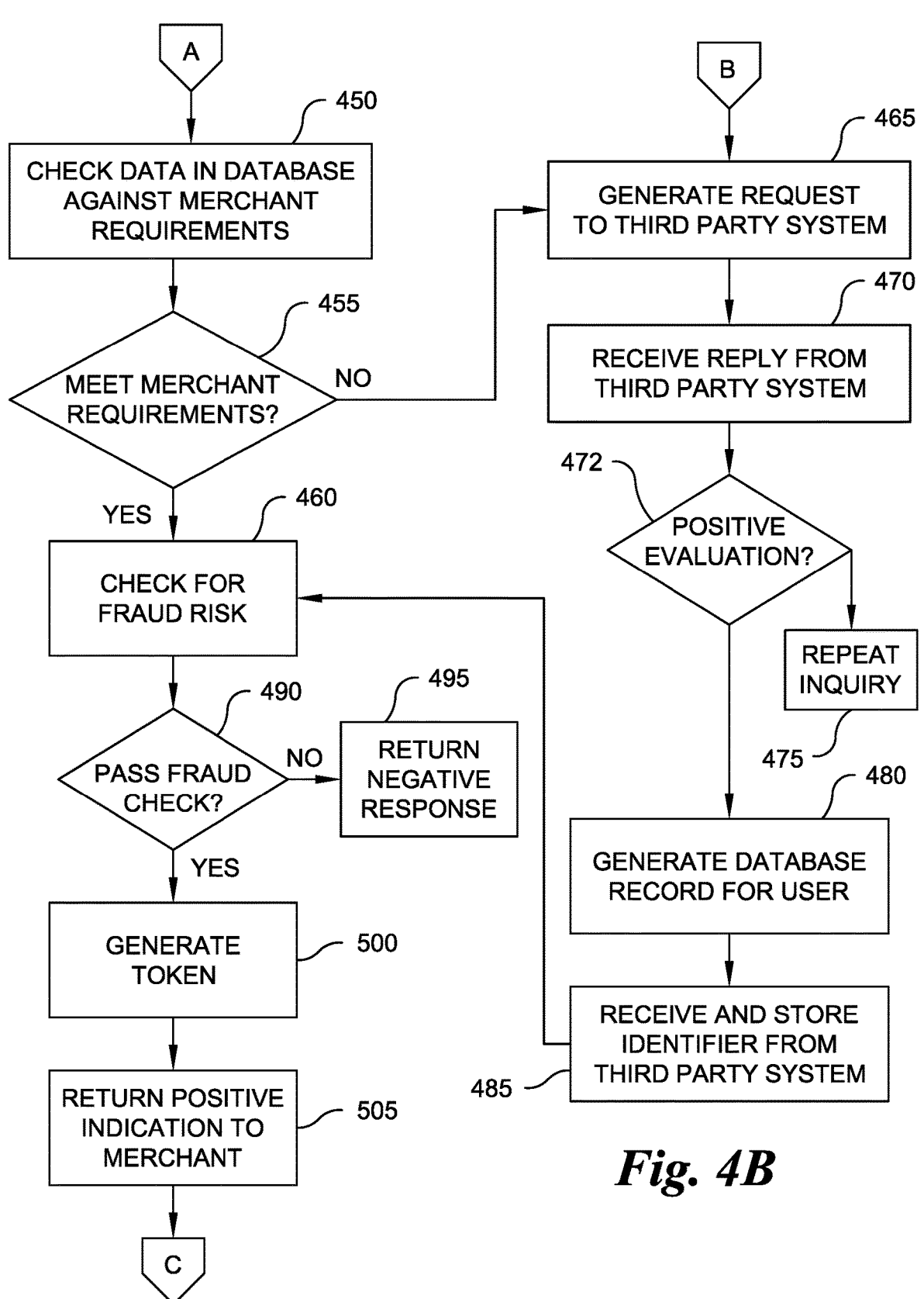
Figure 4C:
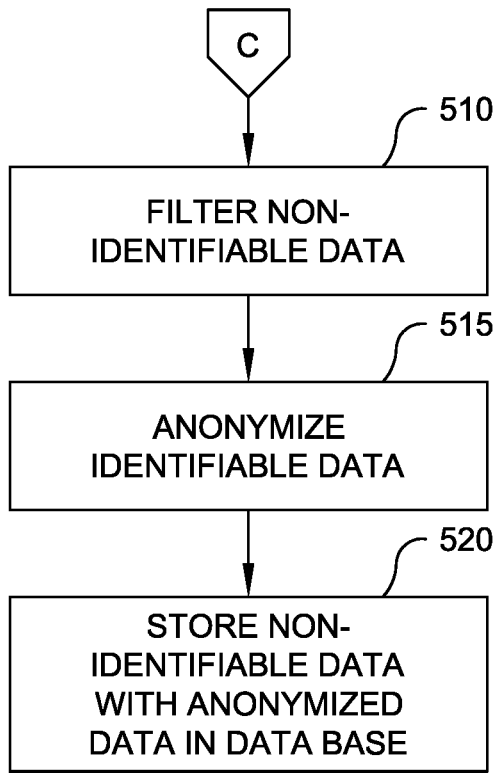

Referring now to FIGS. 4A, 4B and 4C, a process flow diagram of a process that may be implemented in embodiments of the present disclosure is shown. An age verification system receives 405, such as from a merchant system, a request for verification of age of a user from a user device. The request identifies the originating merchant, any merchant specified parameters, which are discussed below, and provides data to permit the age verification system to access a browser session on the user device. The age verification system generates 410 an interface, such as a pop up window, displaying user selectable options for age verification, on the user device, such as in a browser executing on the user device. Options may include, for example, driver's license, passport, other government-issued identification, corporation or institution-issued identification. A user selection is received 415 of one of the user-selectable options. Responsive to the user selection, the age verification system dynamically generates 420 for display on the user device a window having fields suitable for the selected verification method. By way of example, the fields may include fields for entry of name, address, date of birth, issuing jurisdiction, identification number, card type, card number, and additional fields. The interface may be configured to attach a scan of an identification card, for example.

The response from the user is encrypted and is then received 430 by the age verification system and decrypted. The responsive data is passed 430 through a series of rules to determine that the response is complete; rules may include requiring that all fields be completed, that fields include a particular number of alphanumeric characters, by way of example. Responsive to determining that one or more fields is not complete, the system generates 435 a display including a request for corrected data in a window on the user device. In embodiments, the determination that complete data for each required field has been submitted, and is in the proper format, such as verification of number of characters (e.g., 5 or 9 characters for U.S. zip code), proper character type (e.g., numerals, letters as appropriate), may be performed at the user device browser by the code provided by a web server of the central age verification system. Responsive to determining that the fields are complete, the age verification system checks 440 its local databases for matching data. As local databases of the verification system may retain only hashed data, the data received from the user device may be hashed and compared to hashed data. Responsive to determining that the received data is already in its local databases, the age verification system checks 450 data in its databases against merchant requirements. If the age verification system identifies that the e-mail address, or other address identifier, is already in use, then an error is indicated, and a message is generated at the browser.

Returning to block 445, responsive to determining that the local database does not contain a match, the process proceeds to generating 465 a request to a third party system for confirmation. A request is secured, such as via SSL or other protocols, and includes sufficient data, such as name, age, type of identification, identification number and similar data, for a verification. An identifier is generated, provided to the third party system, and stored. The third party sources may include a wide variety of sources, including databases of property records, utility records credit card data, driver data, institutional and corporate data, general government identification data such as national identity numbers, and commercial sources, such as LexisNexis, Veratad Technologies, and Trulioo, by way of example. A reply is received 465 from the third party system. The reply may include data indicative of accuracy of multiple data fields, such as first name, surname, various address elements, document number, and birth year, birth date and birth month, based on the source. The accuracy may be binary, or may be indicative of degrees of accuracy, such as indicative of a number of characters that are inconsistent, or a percentage of characters that are inconsistent. Based on the reply, one or more algorithms, such as algorithms providing weights to values returned by the third party system, the system determines 472 whether a threshold level of confidence has been met. If the reply is negative, the process flow may proceed to repeating 475 the inquiry, generating an interface for the user to select an alternative method, or concluding the process and returning to the merchant server a negative result. Responsive to a positive result, a data record is created 480, and the identifier is stored 485 as an identifier of the transaction between the central system and the third party data source. The identifier is also maintained by the third party source to provide an audit record.

In embodiments, the result may be a minimum age with a level of confidence. In other embodiments, the result may be an age range with a level of confidence. For example, a third party source may be assigned, by the central age verification system, for a given returned age, one or more age ranges and associated confidence levels. For example, age returned from the third party source may have a confidence of level of 99% within five years and 90% within two years. For a site requiring a confidence level of 97% probability of age of at least 21 years, a returned age of 23 years would thus not meet the required confidence level, but an age of 27 would meet the required confidence level.

Responsive to a positive result from the third party source, or to determining that the stored data meets merchant requirements, the process flow proceeds to running rules for determination of fraud risk 460. These rules may include checking internal or third databases for fraud risk, such as lists of IP addresses, email addresses, MAC addresses, stolen credit card numbers, stolen identifications, identification data used repeatedly for age verification, and the like, as well as running rules such as rules indicative of mismatches between geographical information in an identification and geographical information, and rules relating to detecting of proxies and weighting of fraud risk associated with use of proxies. The running of fraud risk may include determining a fraud risk value and comparing the fraud risk value to a threshold, in addition to or as an alternative to binary rules. The threshold, or multi-dimensional thresholds, may be set by merchants.

Responsive to a positive result, the process flow may generate a data record, including an alphanumeric identifier, the level of approval, the third party source, and the user data. This data record is maintained temporarily, as explained below. A token is then generated 500, and provided to the user device; the token is associated with the data record for later reference. A responsive message is provided 505 to the merchant system, to enable the merchant system to proceed with providing content, checkout, or other steps requiring age verification. In the event of a negative response 490, a negative determination 495 is provided to the merchant.

The process flow then proceeds to filtering 510 from the data record the data that is not identifiable, such as the verification steps, third party source, alphanumeric identifier and token data. The filtered data is added to a local database, along with an identifier, shared with the third party source, which provides an audit trail for the verification check.

The remaining data following filtering is identifiable data. Examples of identifiable data include name, address data, phone number, e-mail, credit card number, national identity number, driver's license number, IP address, device data and the like. This identifiable data is subject to a process of anonymization 515 so that the data cannot be recovered. By way of example, the data may be subject to a one-way hash. The hashed data is then stored 520 in the local database with the other data in the data record.

The method, or methods, by which a verification has occurred is, as per the method outlined in these examples, recorded and linked to the anonymized token. The determined confidence value may also be included in a record with the token, the identification of one or more methods of verification, and a determined age, or range of ages. This record may be made available to or transmitted to the site operator ('merchant'). The record does not contain any personal information, but only the token, determined age or age range, or minimum age, confidence level or levels, and one or more types of verification.

Regions of physical storage devices, such as hard drives and flash drives, that temporarily stored identifiable data, are then sanitized. The sanitization process may include overwriting regions that contained personally identifiable information with patterns of data so that no personally identifiable data may be retrieved.

Referring now to FIG. 5, an exemplary table representing fields and exemplary values from a database of values stored in the central verification server and accessed upon receipt of a request for age verification. It will be appreciated that the example of FIG. 5 is a simplified example. A merchant user representative may access the table, after suitable verification, and update and set values. In embodiments, rules automatically determine required documents and default confidence levels. The first row represents field names. The field names include a merchant name, a transaction type, a jurisdiction, a first verification type, a second verification type and a threshold confidence level. The transaction type represents a selected transaction type, from a large number of types of transactions that require age verification. A merchant may select a transaction type via a user interface. The jurisdiction field represents one jurisdiction in which the merchant plans to do business. The remaining fields may be automatically populated based on system rules, or may be user selected. A first verification type field indicates a type of verification that a user is first prompted to provide. In embodiments, the first verification type may be indicated as a user-selectable option of two or more verification types. A second verification type field indicates a second verification type that is employed if an attempt to verify using the first verification type results in a confidence level below a threshold. A threshold confidence level type field may be set to determine a threshold level of confidence in the age verification.

When selecting threshold confidence levels, in embodiments, a level of certainty or 100% may not be an option. This reflects the fact that databases will return errors. The central system may set error rates, or maximum confidence values, for various third party sources of data. Verification resources other than databases may have other error rates. For example, reliance on a phone number or a credit card may have lower accuracy rates than databases containing numerous fields regarding individuals.

In embodiments, a site operator (merchant) may require an age to be verified to a threshold level which is higher than the confidence level of a particular method or resource. For example, records of registered voters are a category of third party resource. The level of confidence assigned by a central system to records of registered voters in different jurisdictions may vary. Accordingly, a site operator may indicate that registered voter records are to be the first type of data checked, and may specify a particular level of confidence. For an individual residing in a first jurisdiction, the registered voter records may have a sufficient level of confidence. However, for an individual residing in a second jurisdiction, the registered voting records have the second jurisdiction may have a confidence level below the specified level of confidence. Accordingly, a second verification step may be required for individuals living in the second jurisdiction. The threshold level of confidence may be specified by regulation, for example.

In operation, a central age verification system receives a request for age verification, including a merchant identifier and a location identifier, and accesses the table to determine verification techniques and confidence level. The system may dynamically generate an interface, which may be displayed in a pop up window on a user's browser, having the requirements for first verification type displayed.

Referring to FIG. 6, there is shown a schematic block diagram illustrating a system and method for verification of users of an age-limited service, such as an adult content provider, in an arrangement in which a regulator, such as a government entity, is authorized to verify that all providers of age-limited content or products are employing an independent and approved age verification provider. A merchant system 620 requests (A) age verification technology from age verification provider system 610. The age verification provider system 610 delivers suitable technology, such as API access, and the merchant system implements (B) suitable triggers, such as code to cause age verification to be invoked based on rules associated with selected products prior to checkout, or age verification to be invoked upon entry, such as in the case of an adult website. In embodiments, an assertion capability may be provided, such that upon a test, such as a ping from a regulating website, the merchant returns a code, token or other data that can be confirmed by age verification provider 610.

Upon commencement of operation of merchant system 620 as an adult website, adult websites listing generator 630, which conducts automated searches to identify adult content providers, and maintains listings of providers and associated URLs, adds (C) merchant system 620 to its listing. Regulator 640, which may be a government entity or system acting on behalf of a government, may assess and approve (D) age verification provider 610. Approved providers are added to a register of approved providers. Regulator 640 includes a verification service, which periodically accesses (Step 1) a listing of adult sources from listing generator 630.

The regulator will compare the listing of adult sources with a whitelist. The whitelist may be a database of sites that may be mistakenly characterized by automated services, such as listing generator 630, as adult websites. By way of example, websites providing health and medical information may be mistakenly characterized as adult sites. Regulator 640 pings sites not on the whitelist to determine that an approved age verification technology is implemented (Step 2), as well as the identity of provider 610. The regulator 640 then pings (Step 3) provider 610 for confirmation that merchant 620 has implemented and is presently using the age verification technology provided by provider 610. Provider 610, in response to this ping, may verify table settings used by merchant website 620, such as to verify that the age settings conform to age limits in the jurisdiction of regulator 640. Provider 610 returns a response as to verification. If the response from provider 610 is negative, or if website 620 does not respond with an indication of use of age verification provider, regulator 640 may add the website 620 to a list of websites in violation of requirements. The URL's of such sites may automatically be propagated to filtering mechanisms maintained, for example, in Internet resources such as directory services, to block such unapproved systems access, to filtering software installed on local devices, modems, Internet service providers and other access points, and the like. The addresses may also be referred for enforcement action.

The technical challenge of accurately providing age verification data while protecting against data hackers is thus addressed by the combination of steps and procedures set forth herein. The direct communication of user data between the age verification system and the user device, with no user data passing through or being stored at the merchant server, avoids the risk of hacking of personal data stored at the merchant server. The anonymization of user identifiable data, and the sanitization of regions of storage devices employed for temporary storage of identifiable data, prevents the disclosure of user identifiable data even if databases are hacked. The maintaining of an identifier of the transaction between the age verification system and the third party resource permits auditing of age verification steps.

In another embodiment, a system is configured to leverage filtering schemes employed by service providers to block websites from devices operated by selected users, such as users under a certain age. By way of example, such as scheme may include a list of blocked URLs for mobile devices in a region. Such listings may be multiple directories, and may be accessible resources other than URLs, and are not limited to cellular networks. An example is maintained by cellular network operators in the United Kingdom, in which listed URL's may only be accessed by cellular telephones associated with adult users. In an embodiment, a request for age verification may be received, and a link to a website, the URL of which is on such a list of blocked URL's, is attempted to be opened in the background, imperceptible to the user. The age verification operator may maintain one or more such URL's or resources, and provide each of those URL's or resources to the lists of block URL's. As part of the automatic processing associated with attempting to open the site at the URL, the originating cellular subscriber or number is checked, such as by the cellular network operator's processing systems, to determine whether the subscriber or number is identified as an adult. By way of example, a look up table may be employed, among data associated with the subscriber in the databases of the cellular network operator, or an indication of the adult or non-adult status may be automatically included in the request. For subscribers or cellular numbers associated with a non-adult, the URL is checked against a list of blacklisted URL"s. The URL that the central server automatically causes the originating phone to attempt to open is blacklisted. Accordingly, an error message will be returned for a cellular number or subscriber who is not an adult. The user is then determined not to be an adult, and a message indicative of that status is returned to the website, which will then proceed as part of its processing to deny access to requested content, to decline to engage in a purchase transaction, or otherwise decline to carry out an action requested from the originating cellular phone. If the site automatically opens, in the background, then a suitable message may be returned to the website to signify that the requesting cellular phone is an adult, and that the request for access, purchase or other action may proceed. In addition, an authorization token may be automatically saved on the browser of the user cellular device. On subsequent attempts of age verification, the central system may simply check the token. In embodiments, the identification of a token may prompt a request for the user to create an account, such as by using an e-mail address. Thus, an approach to age verification, transparent to the user, and thus avoiding user frustration and delay, and leveraging an existing resource, is provided.

Referring now to 7A-1, 7A-2, 7B-1, 7B-2, 7C-1 and 7C-2, there is shown a flow diagram depicting an exemplary process flow of an embodiment leveraging filtering schemes employed by service providers to block websites from devices. The process flow may be implemented in the environment of FIG. 3. A user may be operating an end user device, such as a smart phone, tablet computer, laptop or other device. In embodiments, the end user device may be a smart phone, tablet or other device communicating via a cellular network. The end user device initiates a request to a merchant resource 702, such as a website maintained by a merchant, to obtain age-restricted content or purchase an age-restricted product. Responsive to the request, the merchant server system loads 704 a suitable library, such as the AgeChecked library, and initiates a request to the central server system, the request including a secure merchant identifier, such as a key or token associated with the merchant. Responsive to the request, the central system authenticates 706 the request, such as by determining whether the merchant key is valid. Responsive to determining 708 that the merchant key is not valid, the central system returns 710 an error message to the merchant system. Responsive to determining the merchant key is valid, the central server generates 712 a unique modal or popup, and provides an URL for the modal. Direct communication between the central server and the user device may now be established. On the merchant website, the Iframe Modal or popup window is opened 714, and an overlay modal is loaded 716. The web server of the central system checks 718 for a pre-existing authentication token or cookie stored on the browser of the end user device. Responsive to determining that there is no such token on the end-user's device, the web server transfers processing to the central server, which determines 720 the geo-location of the user device based on such data as IP address and proxy score. The central server may requests of a third party API of a provider of IP intelligence and online fraud prevention, such as MaxMind LLC of Waltham, Massachusetts, USA, geo location and proxy score and network data, such as identification of a network. Responsive geo-location, proxy score and network data is returned to the central server. The central server checks settings of the merchant account, such as to determine required scores or types and numbers of authentication approaches.

The process passes back to the web server, which determines 726 whether the user has requested restricted content of a specified type for which a directory is available, such as age-limited sites on mobile networks in a geographical area, e.g., the United Kingdom. Responsive to determining that the requested content is so restricted, the web server loads 728 a prompting confirmation message on the browser on the user device. Responsive to receipt 730 of user consent to age confirmation via the browser, the web server initiates a hidden redirect 732 to a URL that is listed in one or more directories of age-restricted sites. The URL has been listed as age-restricted in the directory or directories, and the use of the hidden redirect leverages the directories for use in determining whether the user is age verified. If the user's originating device is not associated with an adult, the cellular network systems will prevent access to the URL, and instead an error message, such as "403 Forbidden," will be received. Responsive to receipt of the error message, it is determined that the user is not allowed to access the site 734, and process flow proceeds to a step of closing the modal and returning a response that the user is not age-verified to the merchant system, referring to FIG. 7C-1.

Responsive to determination that the URL is able to open, then process flow proceeds (referring to FIG. 7C-2) to processing 736 the responsive data from the geo-location and anti-fraud service, and then determining 738 whether the user is verified. Responsive to determining that the user is verified, the process flow proceeds 740 to closing the modal and providing a positive response to the merchant server. Responsive to determining that the user is not verified, a failure message is displayed on the user device 741, and a prompt for the user to select to try again for verification is displayed 742. Responsive to a negative response from the user, the process proceeds to closing the modal and providing a negative response to the merchant server.

Figures 2, 7A:
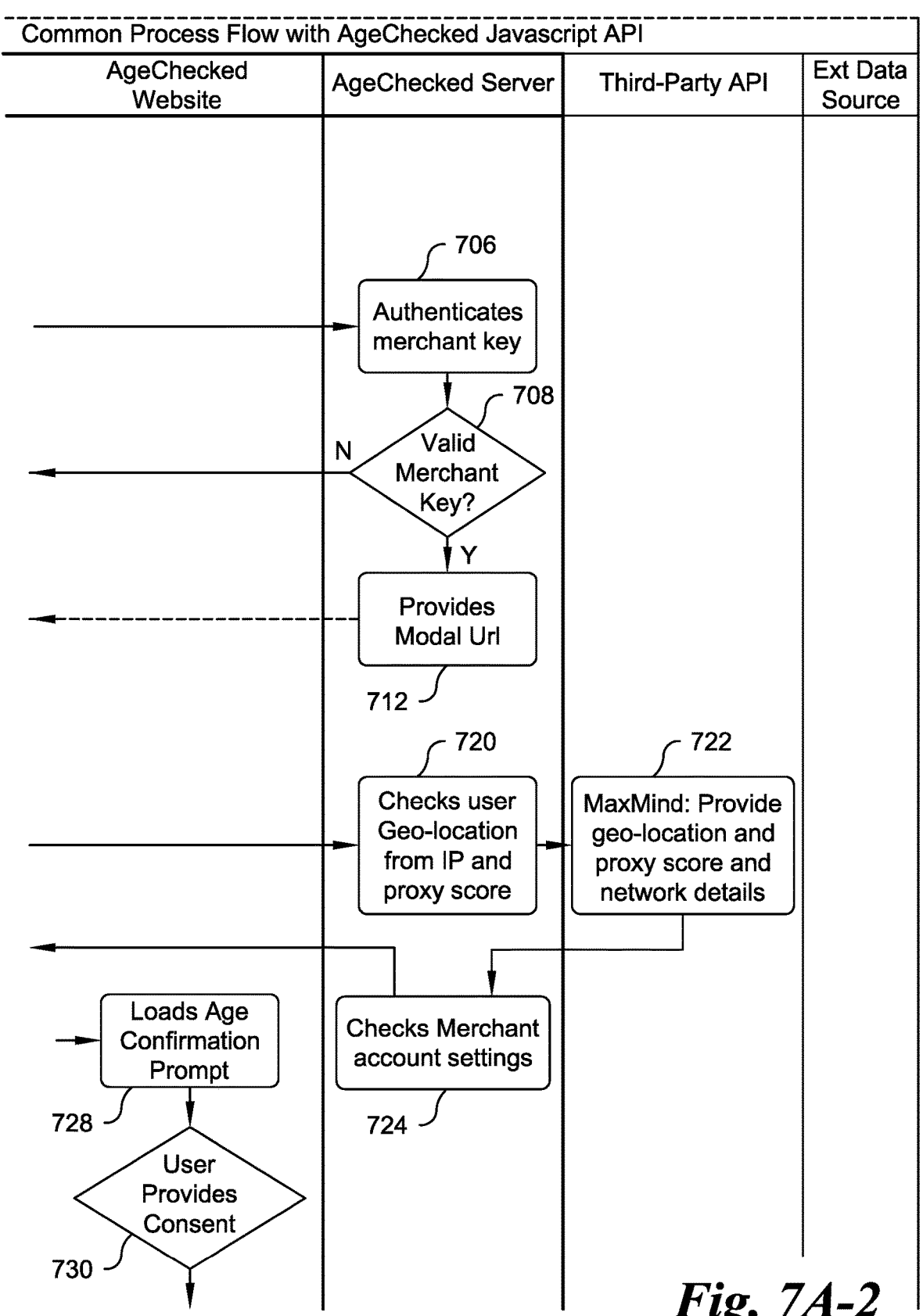
Figures 1, 7B:
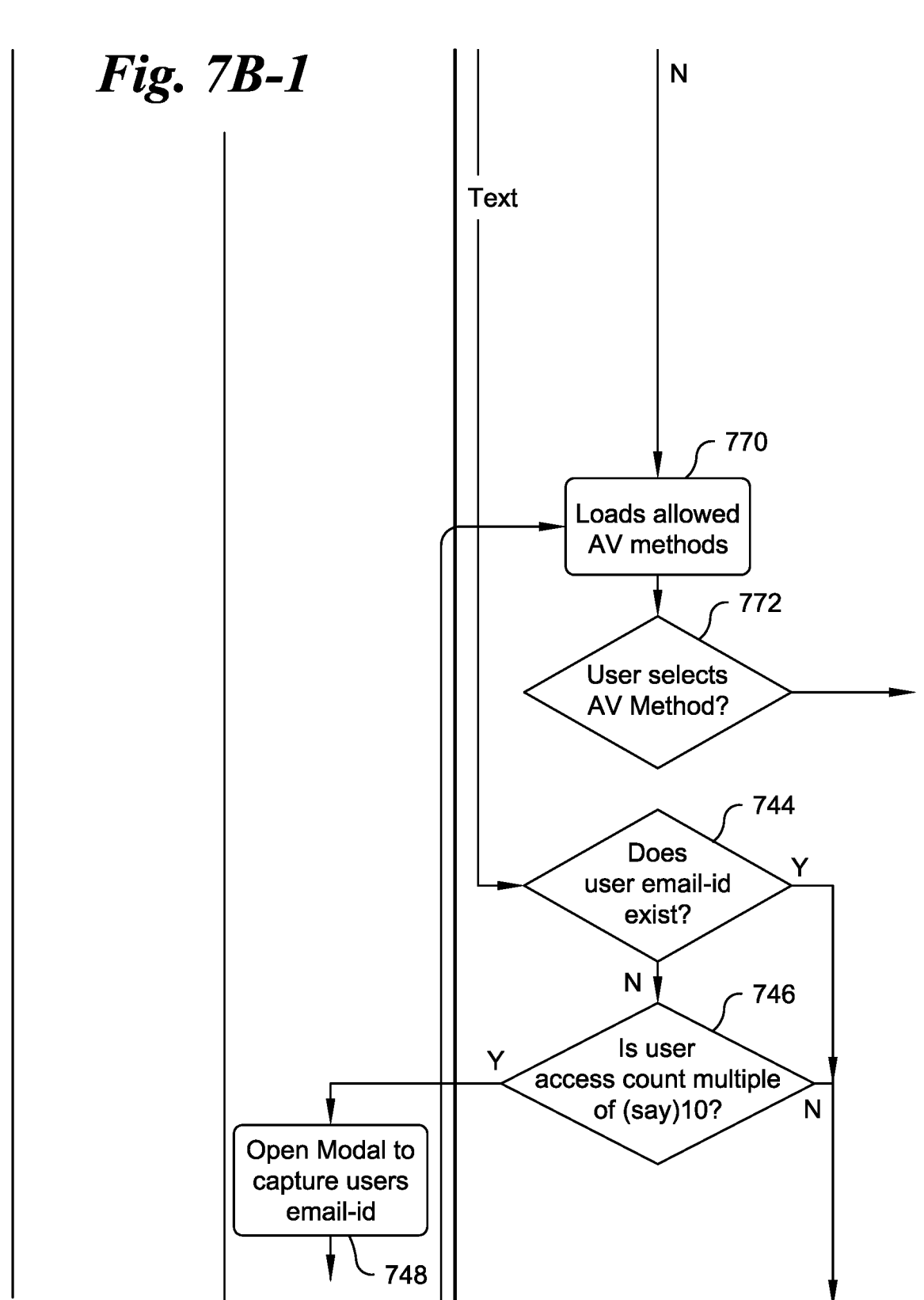
Figures 2, 7B:
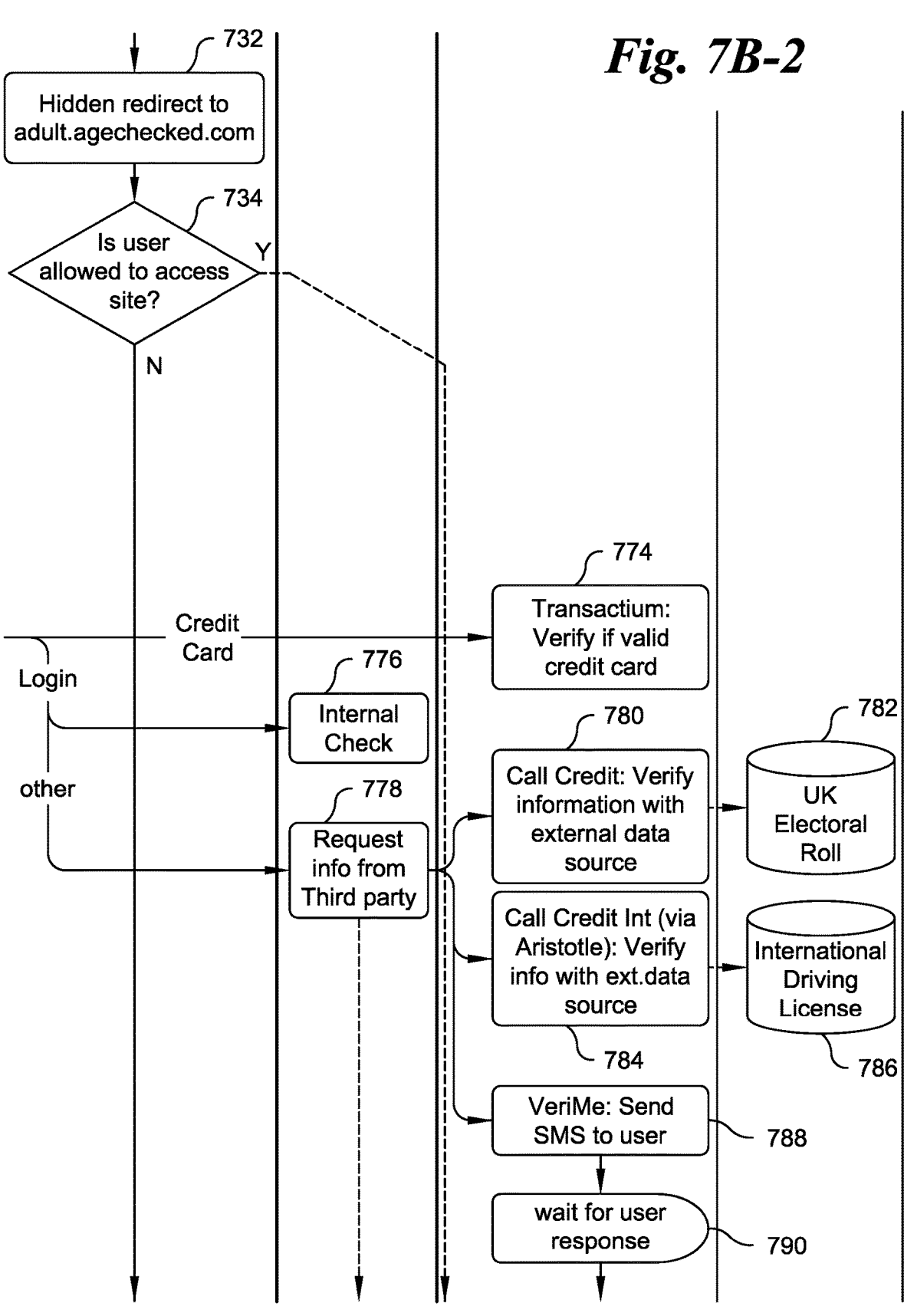
Figures 1, 7C:
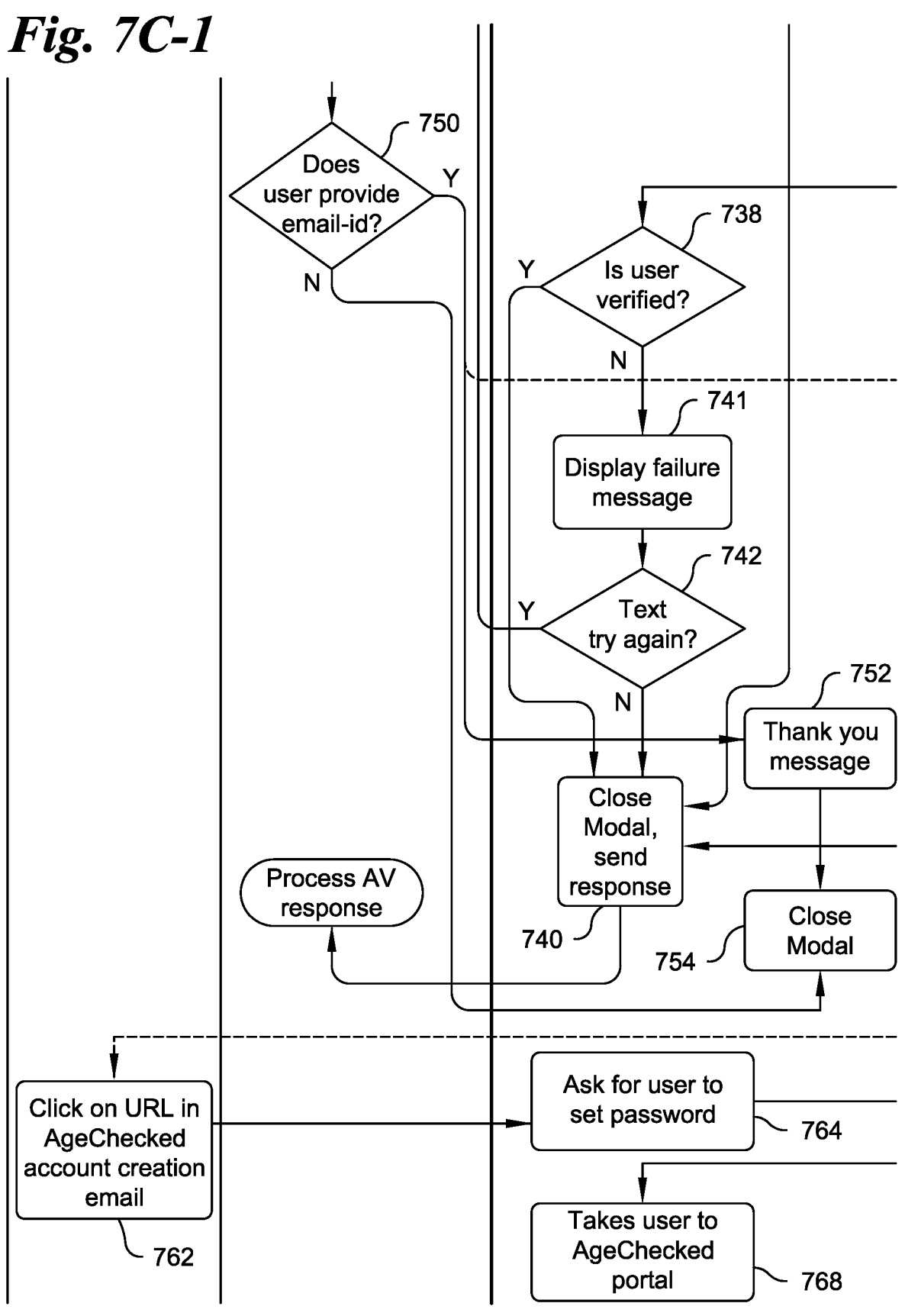
Figures 2, 7C:
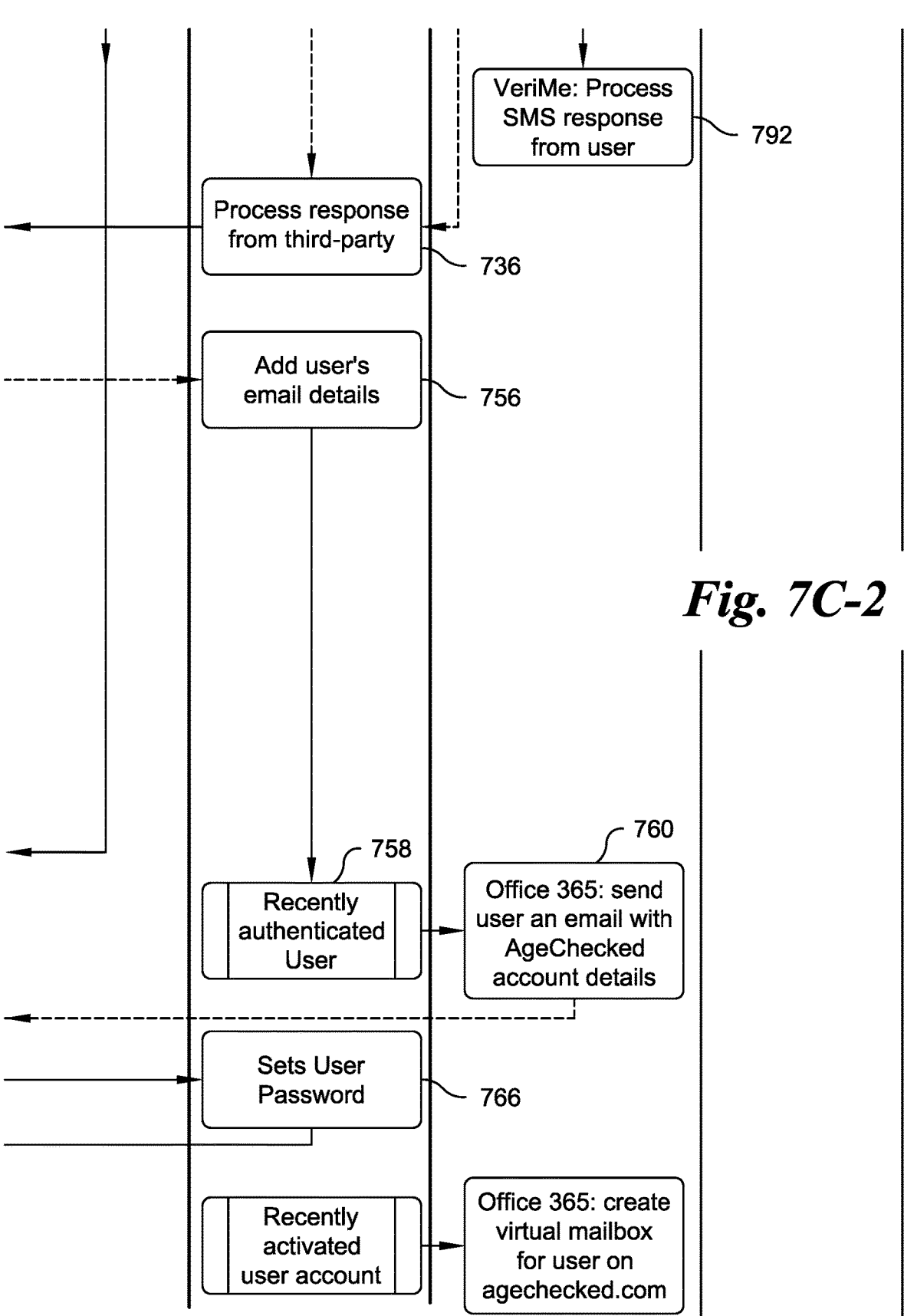

Referring now to FIG. 7A-1 and block 718, responsive to identification of authorization token cookies on the user device browser, the process flow proceeds (referring to FIG. 7B-1), determining whether a user id corresponding to the e-mail identification exists 744. A negative determination is indicative of a cookie placed on the browser after a successful age verification, and may be limited to a certain number of uses, a certain time after initial successful age verification, or otherwise limited. Alternatively, an invitation to provide information for an account is provided based on number of elapsed uses or time. Responsive to a negative determination, the system determines 746 if the access count is a multiple of a number selected by the system, and, responsive to a positive determination, opens 748 a model with a field for input of a user e-mail identification. Responsive to input of the identification, a thank you message 752 may be displayed and the modal closed 754. Responsive to user not inputting the identification, the modal may be closed. Further responsive to input of the identification, the process flow passes to the server, which adds the user's e-mail information 756. For recently authenticated users 758, a third party API configured for e-mail generation, such as Office 365, may send 760 and e-mail with account details. The process flow then provides a link in the e-mail 762 to a web page requesting password creation 764; the password is created 766, and a main portal web page is opened 768.

Referring now to FIG. 7A-1 and block 726, responsive to determining that the user is not visiting a site registered as age restricted, the process flow proceeds to loading 770 of age verification methods in accordance with merchant client instructions. Responsive to user selection 772, the process flow proceeds to one of the methods. A third party API, such as Transactium, may verify 774 a credit card number. An internal check 776 of the server's existing records of verified persons may be employed based on a user login. Other requests 778 may be made to third party data sources, such as a Call Credit database 780 for verification via electoral rolls 782, Call credit database 784 for verification via driver's licenses database 786, VeriMe to send a code via SMS message to the user to enter, and, depending on user response 790, process the response 792.

The above embodiment provides a process that unconventionally leverages available databases maintained by cellular network operators for another purpose, namely to restrict access to websites from cellular phones, to perform age verification for other purposes, such as access to age-restricted resources or sales not on the list.

A technological challenge involved in the use of payment card data for use in age verification is that the payment card data or payment cards may be accessed by persons other than the user.

Figure 8:
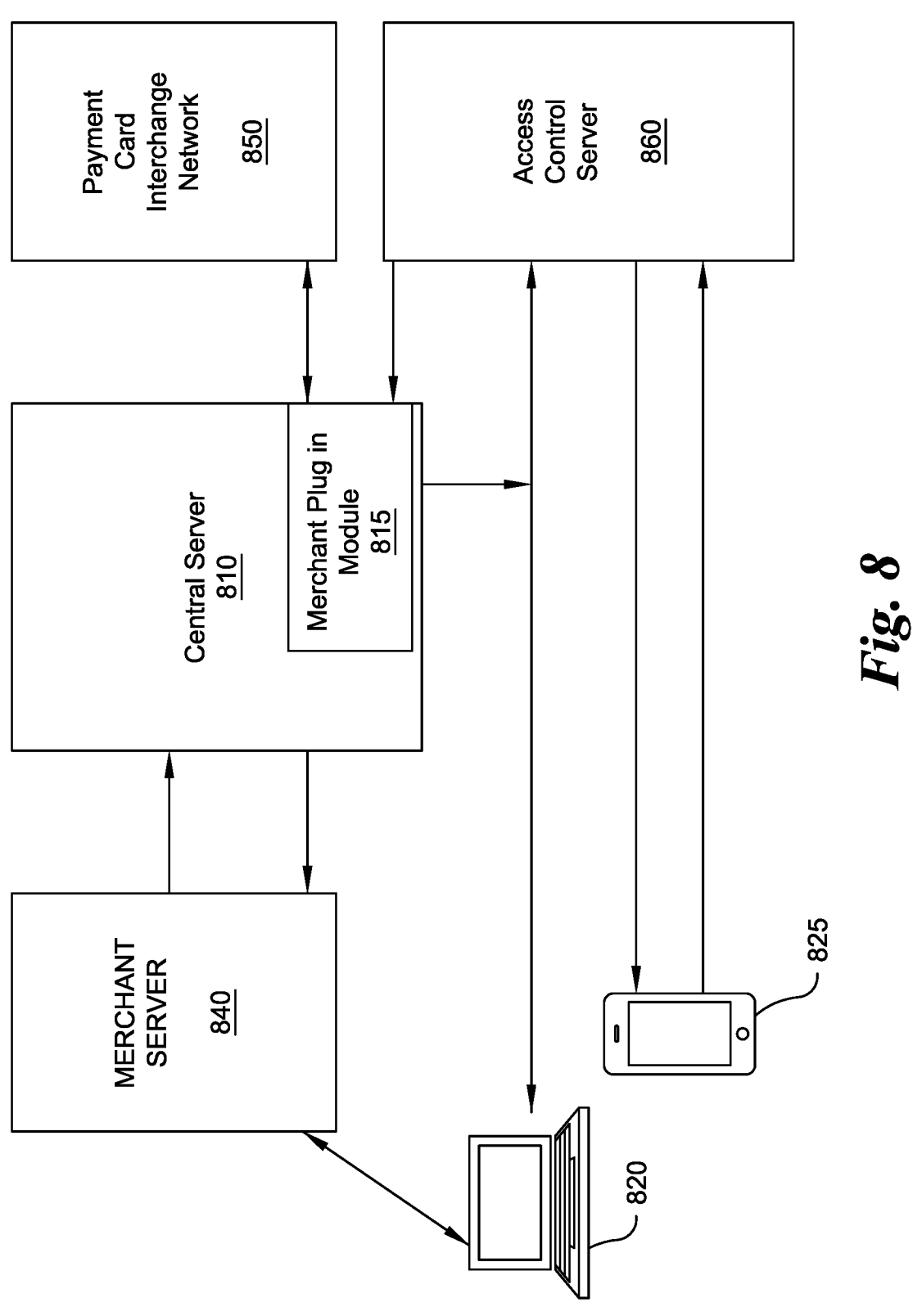
FIG. 8 is a schematic diagram illustrating a method and system for providing age verification leveraging financial system security arrangements.

Referring now to FIG. 8, there is shown a schematic diagram showing components in a network environment in which an age verification system addresses the challenge of acquisition by persons other than the user of access to payment cards and payment card data. In this embodiment, authentication using payment card networks for purposes other than transaction processing are provided. A merchant server 840 may be a provider of content, for example, that is age restricted, or provide sales of age-restricted goods. A user, employing a consumer device, depicted here as laptop 820 by way of example, but which may be any networked device, such as a cellular phone, desktop computer, tablet computer, Internet-connected television, or other device, accesses the merchant server 840 to request age restricted content, services or products. The data provided by the user device includes payment card data, such as name, card number, and may include such verification data as billing address and CVV code. The merchant server 840 forwards a request for age verification to the central server 810. The central server 810 may be as described in connection with any of the above embodiments. The central server 810 includes a module, which may be in the form of processor-executable code, stored on a memory of the central server 810 indicated as merchant plug-in module 815. The instructions in the merchant plug-in module cause a central server processor to identify a web resource for an issuing bank of the payment card. The central server may be registered with a payment card interchange network 850, that connects parties involved in payment card transactions, such as merchants, issuing banks, and payment card systems. Such payment networks are also referred to as interchanges and interchange networks. Such payment networks provide for transmission of messages compliant with an applicable interchange message specification, such as ISO 8583. Participating devices in such networks include merchant point of sale systems and devices, payment card processing computer systems of acquiring banks, payment card processing system authorization networks and payment card processing computer system of the issuer bank. The issuer bank is the bank that issued the payment card. Issuer banks further maintain access control server systems to provide authentication services on receipt of requests transmitted by the payment card processing system authorization network to the issuing bank computer systems. Examples of such payment card interchange networks include the MASTER- CARD® and VISA® networks. Unlike a conventional request via the payment card interchange network, the request is for verification of cardholder identity, but does not include transaction data such as transaction amount. Responsive to the request, an issuing bank access control server system 860 automatically communicates directly with the user device 820, providing for example a pop up on a browser program running on the user device. This direct communication may be referred to as a direct session. The direct session requests input of verification data, such as by display of a data entry field and display of an instruction to input a code.

The verification data may be in the form of a password or code known to the user, which password or code may be fixed. The verification data may be in the form of a code transmitted by a separate channel to a device or account associated with the user. The verification data may be automatically transmitted via the separate channel. The separate channel may be, for example, SMS or text message to a cellular phone 825 associated with the user in the issuing bank's database. The separate channel may be an e-mail address associated with the user in the database of the issuing bank, or an address for another type of communication that may be directed to the user, such as a communication via another communication service, such as the Messenger service, the WhatsApp service, or another service.

Responsive to input in the pop up display, the input data is returned to the central server. The merchant plug-in program receives the input data and compares the received input data to the code. Responsive to detection of a match between the input data and the code, the merchant plug-in returns a message to the merchant server indicating successful age verification. Responsive to detection of a mismatch between the input data and the code, the merchant plug-in may renew the direct session to receive a subsequent attempt to input the code, provide another code, or terminate the direct session and provide a message to the merchant server indicating that age verification has not been successfully provided.

In embodiments, the access control server 860 may provide verification without initiating a direct session on user device 820. For example, the access control server may provide a communication to user cellular phone (or other device) 825 requesting a return confirmation, such as a reply text message. Responsive to receipt of a positive response from the cellular phone 825, the access control server 860 returns a positive response to central server 810, which in turn returns a positive age verification response to the merchant server 840.

In embodiments, the central server and merchant plug in module do not receive full payment card data, but only sufficient data to obtain a URL or other access to the access control server 860, and identifying data of the user device. Upon receipt of the respective data, the merchant plug-in initiates a direct session by redirecting the browser executing on the user device 820 to the URL of the access control server 860. The central server in this embodiment does not transmit or have access to the password or code data transmitted between the access control server 860 and the user device 820.

Thus, the availability of higher levels of security associated with payment card networks may be leveraged. The verification based on the payment card network may be integrated into a determination of confidence of the age verification of the user.

Referring now to FIG. 9, a process flow diagram is provided illustrating a process flow of the embodiment of FIG. 8. A central server computer receives 902 a request for age verification. The following steps may be performed by the central server computer executing computer-readable instructions of a merchant plug-in module stored on a memory. The request may include data indicative of a payment card, and data permitting direct communication with an originating user device, such as an IP address of the originating device. Responsive to receipt of the request, the central server computer requests 904 verification via a payment card network. The payment card network returns 906 a URL of an access control system of an issuing bank. A direct session is initiated 908 between the user device and the access control server. A verification response is received 910 from the access control server. Responsive to a determination of validity, the central server returns a response, indicative of age verification pass or fail, for example, to the provider server.

The flow charts described herein do not imply a fixed order to the steps, and embodiments of the present invention may be practiced in any order that is practicable. In embodiments, one or more steps of the methods may be omitted, and one or more additional steps interpolated between described steps. Note that any of the methods described herein may be performed by hardware, software, or any combination of these approaches. For example, a non-transitory computer-readable storage medium may store thereon instructions that when executed by a processor result in performance according to any of the embodiments described herein. In embodiments, each of the steps of the methods may be performed by a single computer processor or CPU, or performance of the steps may be distributed among two or more computer processors or CPU's of two or more computer systems.

Throughout processing steps, accessed values, calculated values and draft data, for example, may be stored in temporary memory locations, such as in RAM.

As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

In embodiments, a processor may provide an output signal having data indicative of one or more data items. An output signal may be carried either over a suitable medium, such as wire or fiber, or wirelessly. An output signal may transmit data from one device to another directly, such as over a bus of a computer system from a processor to a memory device, or indirectly, such as over multiple networks, and with intermediate steps of storage in a buffer or memory device and retransmission. Such an output signal may be provided by the processor to a bus of a computer system together with address data at a series of clock intervals. The address data may designate a destination device on a bus, by way of example. In embodiments, an output signal may be a signal output from a hardware communications device of a computer system to a network, such as a local area network, a wide area network, or a network of interconnected networks, such as the Internet. Output signals may include, by way of example, data identifying formats, fields, and content of fields. Signals may be compatible with any appropriate format. Reference to an output signal having particular data may include one or more signals bearing the information. Multiple signals bearing the information may include sequences of digital data bearing the information interleaved with sequences of digital data relating to other information. By way of example, a signal may be packetized for transmission. By way of further example, an output signal may take the form of an uncompressed digital signal or a compressed digital signal.

A system on which the methods of embodiments of the present invention may be implemented includes at least one central processing computer or computer network server. The central age verification server may be a network server. A network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, a network server may be a standalone server computer or alternatively, the functions of a network server may be distributed across multiple computing systems and architectures.

A network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage devices may include hard magnetic disk drives, optical storage units, CD-ROM drives, or flash memory, by way of example. Data storage devices contain databases used in processing steps, such as those embodied in rules and algorithms. In one embodiment, database software creates and manages these databases. Rules and algorithms in accordance with an embodiment of the present invention may be stored in storage devices and accessed and executed by a processor, in accordance with instructions stored in computer-readable storage media. Such algorithms may be embodied in modules of program code, or located in separate storage locations and identified in program code by pointers, by way of example.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media, non-transitory media, tangible media and volatile media. Non-volatile media and tangible media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Processes described in the present specification and illustrated in the drawings may be performed by one or more computer processors reading and executing computer-readable instructions stored in one or more non-transitory computer-readable media.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of embodiments of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc.).

The embodiments described herein are solely for the purpose of illustration. Those in the art will recognize that other embodiments may be practiced with modifications and alterations.

What is claimed is:

1. A computerized method for verifying age of a user communicating from a remote device with a provider system, comprising:
   receiving, by a central computer system, from the provider system, data including a request for verification of the user;
   determining, based on at least one of the data received from the provider system and data on the remote device, whether the user is age verified;
   responsive to determining that the user is age verified, providing an affirmative indication to the provider system;
   responsive to determining that the user is not age verified, communicating directly with the user device for receipt of identifying data without login by the user device to the central computer system;
   receiving, from the user device, identifying data;
   providing, to a third party verification source, the identifying data;

receiving, from the third party verification source, an indication of verification of age based on the identifying data;
providing a token indicative of age verification to the user device;
providing a positive indication to the provider system, including identification of the token;
anonymizing identifiable data relating to the user age verification; and
storing the anonymized data in the database;
wherein neither the provider nor the central system retains user identifiable data.

2. The computerized method of claim 1, further comprising, prior to anonymizing the identifiable data relating to the user age verification, filtering the identifiable data relating to the user age verification.

3. The computerized method of claim 1, wherein the communicating directly with the user device for receipt of identifying data comprises causing a display to be generated on the user device having fields for input of user data.

4. The computerized method of claim 3, wherein the causing a display to be generated on the user device having fields for input of user data comprises generating a pop up box on a user device browser display.

5. The computerized method of claim 1, further comprising causing the token indicative of age verification to be generated prior to providing the token to the user device.

6. The computerized method of claim 1, wherein anonymizing the identifiable data comprises performing a one way hash of the identifiable data.

7. The computerized method of claim 1, further comprising, responsive to receiving data including identifiable user data, anonymizing the received identifiable data, and comparing the anonymized received identifiable data to the stored anonymized identifiable data to determine whether the received identifiable data was previously received.

8. The computerized method of claim 7, wherein the anonymizing the identifiable data prior to storage of the identifiable data comprises one-way hashing the identifiable data, and the anonymizing the received identifiable data comprises one-way hashing the received identifiable data, whereby the comparing comprises comparing the hashed received identifiable data to the stored hashed identifiable data.

9. A computer system for verifying age of a user communicating from a remote device with a provider system, comprising:
   a central system memory, storing processor-executable instructions; and
   one or more central system computer processors in communication with the central system memory, the processor-executable instructions causing the one or more central system computer processors to:
      receive, from the provider system, data including a request for age verification of the user communicating with the provider system from the remote device;
      determine, based on at least one of the data received from the provider system and data on the remote device, whether the user is age verified;
      responsive to determining that the user is age verified, provide an affirmative indication to the provider system;
      responsive to determining that the user is not age verified, communicating directly with the user device for receipt of identifying data without login by the user device to the central computer system;
      receive, from the user device, identifying data;

provide, to a third party verification source, the identifying data;

receive, from the third party verification source, an indication of verification of age based on the identifying data;

provide a token indicative of age verification to the user device;

provide a positive indication to the provider system, including identification of the token;

anonymize identifiable data relating to the user age verification; and store the anonymized data in a database;

wherein neither the provider nor the central system retains user identifiable data.

10. The computer system of claim 9, wherein the instructions further cause the one or more processors to, prior to anonymizing the identifiable data relating to the user age verification, filter the identifiable data relating to the user age verification.

11. The computer system of claim 9, wherein the instructions cause the one or more processors to, in communicating directly with the user device for receipt of identifying data, cause a display to be generated on the user device having fields for input of user data.

12. The computer system of claim 11, wherein the instructions cause the one or more processors to, in causing a display to be generated on the user device having fields for input of user data, generate a pop up box on a user device browser display.

13. The computer system of claim 9, wherein the instructions further cause the one or more processors to generate the token indicative of age verification prior to providing the token to the user device.

14. The computer system of claim 9, wherein the instructions cause the one or more processors to, in anonymizing the identifiable data, perform a one way hash of the identifiable data.

15. The computer system of claim 9, wherein the instructions further cause the one or more processors to, responsive to receiving data including identifiable user data, anonymize the received identifiable data, and compare the anonymized received identifiable data to the stored anonymized identifiable data to determine whether the received identifiable data was previously received.

16. The computer system of claim 15, wherein the anonymizing the identifiable data prior to storage of the identifiable data comprises one-way hashing the identifiable data, and the anonymizing the received identifiable data comprises one-way hashing the received identifiable data, whereby the comparing comprises comparing the hashed received identifiable data to the stored hashed identifiable data.

17. A computerized method for verifying age of a user communicating from a remote device with a provider system, comprising:

receiving, by a central computer system, from the provider system, data including a request for verification of the user;

determining, based on at least one of the data received from the provider system and data on the remote device, whether the user is age verified;

responsive to determining that the user is age verified, providing an affirmative indication to the provider system;

responsive to determining that the user is not age verified, communicating directly with the user device for receipt of identifying data without login by the user device to the central computer system;

receiving, from the user device, data indicative of user identification, including at least a payment card number comprising a predetermined number of digits in sequence;

accessing, by the central computer system, data indicative of ranges of values for selected sub-sequences of digits, each of the ranges of values indicative of a range of values corresponding to ranges designated by one or more card issuers for issue of payment cards;

applying, by the central computer system, the payment card number data to the data indicative of ranges of values, to determine whether or not the payment card data corresponds to one of the designated ranges; and responsive to determining, by the central computer system, that the payment card data does not correspond to any one of the designated ranges, performing at least one of: returning an indication that age is not verified, employing the determination that the payment card data does not correspond to any one of the designated ranges as a negative factor in an age verification confidence algorithm, or prompting the user for a different type of age verification data; and responsive to determining, by the central computer system, that the payment card data corresponds to one of the designated ranges, performing at least one of: returning an indication that age is verified, or employing the determination that the payment card data corresponds to one of the designated ranges as a positive factor in an age verification confidence algorithm.

18. The computerized method of claim 17, further comprising, responsive to returning an indication that age is verified, performing the following steps:

providing a token indicative of age verification to the user device; and providing a positive indication to the provider system, including identification of the token.

19. The computerized method of claim 17, wherein the selected sub-sequences of digits are in payment card numbers between digits corresponding to a Bank Identification Number and a digit corresponding to a checksum.

20. The method of claim 17, further comprising, responsive to determining, by the central computer system, that the payment card data does not correspond to any one of the designated ranges, prompting the user for a different type of age verification data.

* * * * *